United States Patent [19]

Shallenberger et al.

[11] Patent Number: 4,522,780
[45] Date of Patent: Jun. 11, 1985

[54] REMOVAL AND REPLACEMENT OF FUEL RODS IN NUCLEAR FUEL ASSEMBLY

[75] Inventors: John M. Shallenberger, O'Hara Township, Allegheny County; Stephen J. Ferlan, Pittsburgh, both of Pa.

[73] Assignee: Westinghouse Electric Corp., Pittsburgh, Pa.

[21] Appl. No.: 349,126

[22] Filed: Feb. 16, 1982

[51] Int. Cl.³ .............................................. G21C 14/00
[52] U.S. Cl. ..................................... 376/260; 376/272
[58] Field of Search ............... 376/260, 261, 272, 262, 376/251; 252/626, 627; 82/4 R

[56] References Cited

U.S. PATENT DOCUMENTS

| | | | |
|---|---|---|---|
| 3,887,980 | 6/1975 | Yates et al. | 376/261 |
| 3,914,613 | 10/1975 | Shallenberger et al. | 376/261 |
| 3,968,008 | 7/1976 | Piepers et al. | 376/261 |
| 4,079,620 | 3/1978 | Jester et al. | 376/251 |
| 4,290,906 | 9/1981 | Saito et al. | 252/626 |
| 4,292,130 | 9/1981 | Viavd et al. | 376/262 |
| 4,336,103 | 6/1982 | Katscher et al. | 376/251 |
| 4,377,551 | 3/1983 | Adams | 252/627 |
| 4,385,535 | 5/1983 | Tedder | 82/4 R |
| 4,428,903 | 1/1984 | Kasik et al. | 376/261 |

Primary Examiner—Sal Cangialosi
Attorney, Agent, or Firm—D. E. Erickson

[57] ABSTRACT

To remove the bottom nozzle of a nuclear fuel assembly, the nozzle plate must be disconnected from the control-rod thimbles. For nozzles whose control-rod thimbles are connected to the nozzle plate by screw fasteners having lock pins welded to the nozzle plate, a cutter for severing the welds is provided. The cutter is rotated by a motor at the work position through a long floating shaft. A long feed shaft operated by a thumb nut at the work position feeds the floating shaft and cutter downwardly through the weld. The bushings extend from a bushing plate, each encircling a screw fastener. Each bushing has a yieldable sleeve for sealing the region around a screw fastener to trap the chips from the severed weld. The cutter is indexed from weld to weld by indexing plates. To remove chips adhering to the cutter, the suction tube of a suction-pump-operated eductor is inserted in the auxiliary hole and the cutter is inserted in the bushing and chips are removed by suction. By inserting the suction tube into the bushings which seal the regions around the screw fasteners and enabling the eductor, the captured chips may be removed. Once the welds are severed the screw-fasteners may be unscrewed and removed by the eductor. The bottom nozzle may then be removed.

39 Claims, 28 Drawing Figures

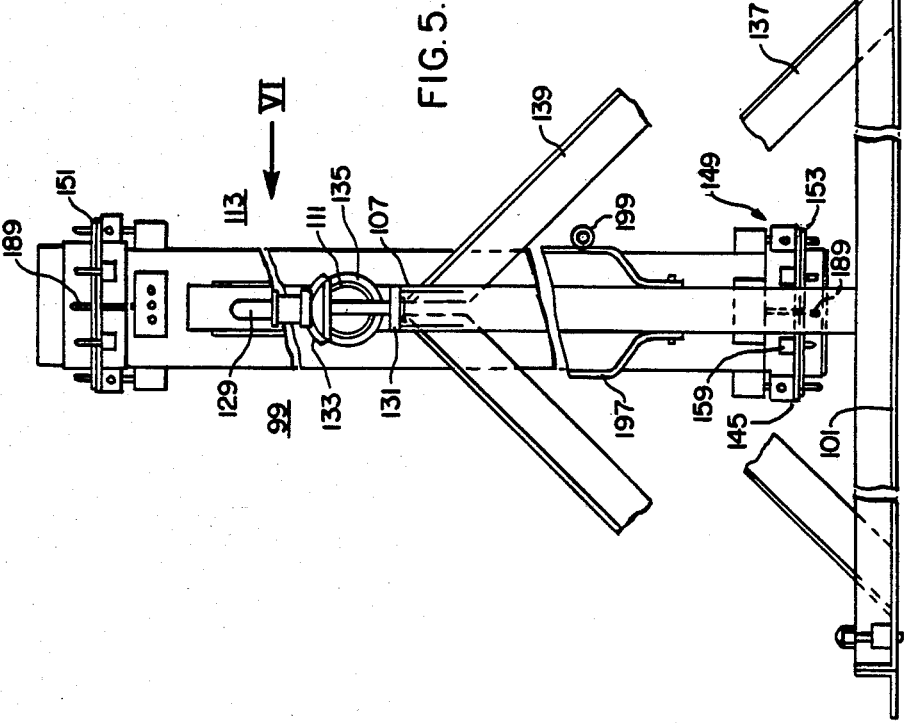
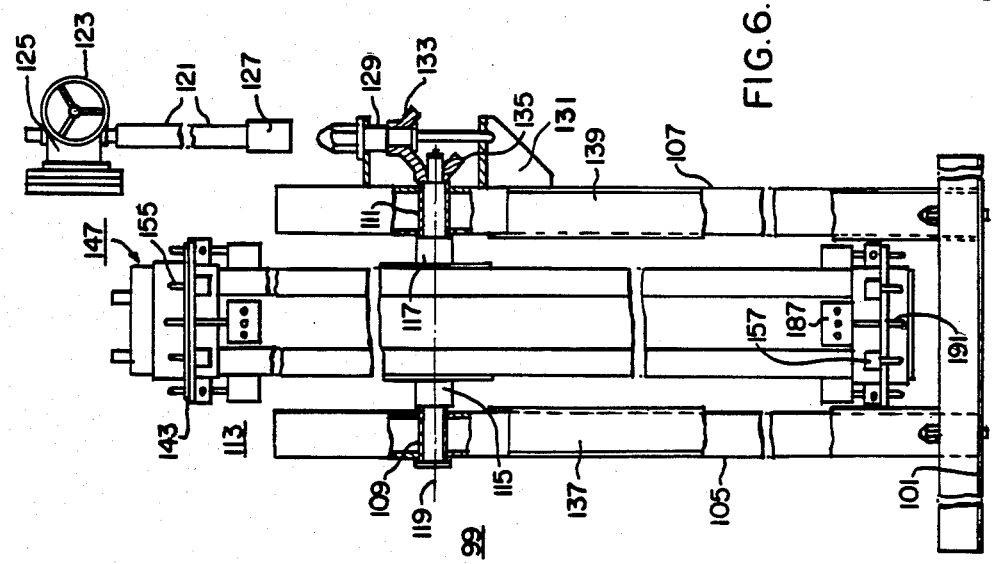

REMOVAL AND REPLACEMENT OF FUEL RODS IN NUCLEAR FUEL ASSEMBLY

BACKGROUND OF THE INVENTION

This invention relates to the art of nuclear reactors which serve as prime energy sources for power plants. It has particular relationship to the processing of the nuclear fuel assemblies of such reactors to remove, replace or rearrange their fuel rods. While this invention is conceived for the purpose of processing fuel assemblies and is uniquely suitable for this purpose, it may be applied for other purposes. The application of this invention to such other purposes is regarded as within the scope of equivalents of this invention as scope of equivalents is defined and explained by the United States Supreme Court in Grover Tank & Mfg. Co. v. Linde Air Products 339 US 605; 94 L.Ed. 1097.

The individual fuel rods of a nuclear reactor are mounted in fuel assemblies. Each fuel assembly includes a skeletal frame or skeleton in which the rods are held by grids. A plurality of tubes for receiving control rods are interspersed among the rods. These tubes are usually called thimbles. Typically, the fuel rods are arrayed in a fuel assembly in a square, 17 fuel rods on each side. There are typically 264 fuel rods and 24 thimbles in each square. Typically each fuel assembly is 14 feet in length. Each fuel assembly includes a bottom nozzle and a top nozzle. The nozzles have holes and the coolant enters the assembly through the bottom nozzle and exits the assembly through the top nozzle. The bottom nozzle are secured to the skeleton and specifically to the thimbles generally by screw fasteners which are screwed into the thimbles and welded or mechanically joined to the bottom nozzle plate. In one type of widely used fuel assemblies the bottom nozzle is secured by screw fasteners each screwed into a thimble and joined to the nozzle plate by a lock-pin pressed into a slot in the head of the fastener and welded to the nozzle plate. Such assemblies are included in many of the reactors which are currently in operation in power plants. Assemblies of alternative structure is disclosed in Application Ser. No. 186,937 filed Sept. 12, 1980 to John M. Shallenberger and Stephen J. Ferlan for RECONSTITUTABLE FUEL ASSEMBLY FOR A NUCLEAR REACTOR and assigned to Westinghouse Electric Corporation now abandoned. This Shallenberger et al application is incorporated hereby by reference. Such assemblies are called reconstitutable fuel assemblies. In reconstitutable assemblies a screw fastener is screwed into the thimble and engages the bottom nozzle plate. A thin cylindrical wall or skirt extends around the head of the fastener and this wall is crimped or swaged into one or more grooves in the nozzle plate. At the top of the fuel assembly each thimble is encircled by a sleeve. The sleeve and thimble are welded to the top of the nozzle plate and are secured together by a bulge below the top.

Fuel rods must be removed from and replaced in fuel assemblies from time to time. Among the typical reasons for the removal and subsequent replacement of fuel rods is the replacement of defective rods, for example, a fuel rod whose cladding is cracked or perforated. It is also necessary to determine if one or more rods of an assembly leaks. In the case of a spent assembly, failed rods should be removed to preclude fission product escape and the attendant hazard. At times a skeleton of a fuel assembly or the assembly itself is damaged. Typically the grids are damaged during reloading or refueling or the grids are damaged by neutron fluence. In the event of such damage it is necessary to remove partially spent fuel rods for transfer to a sound skeleton. It is also necessary to remove or rearrange fuel rods in a fuel assembly for more effective fuel utilization, i.e., to provide a loose-lattice, a spectral shift or to convert an assembly into a so-called driver fuel assembly. It may also be desirable to replace uranium rods by thorium or plutonium rods.

It is an object of this invention to carry out the removal and replacements of fuel rods from a nuclear fuel assembly effectively and efficiently and to provide apparatus and a method for accomplishing this purpose. It is also an object of this invention to provide a method for replacing a welded nozzle on a fuel assembly by a crimped nozzle.

SUMMARY OF THE INVENTION

To gain access to the fuel rods of an assembly for removal and replacement, it is necessary that a nozzle be removed. Removal of the top nozzle presents serious difficulties and removal of the bottom nozzle is most practicable. The assemblies and their parts are highly radioactive and for processing to remove or replace fuel rods, the assemblies are conveniently deposited in racks of a refueling pit under water at a great depth in upright orientation. An assembly is removed from this pit by a crane. It has been realized in arriving at this invention that a fuel assembly cannot be conveniently or safely inverted by crane operation. Attempt to invert an assembly by such operation might dislodge the assembly causing it to drop into the pit where retrieval is difficult and sometimes impossible. A feature of this invention is apparatus uniquely suitable for inverting a fuel assembly raised from a rack while the assembly is under a substantial depth of water so that the bottom nozzle becomes accessible for removal. In accordance with this invention a work-station is provided. This station includes a container which houses the fuel assembly. The container is rotatable by operation of a drive shaft from a work position above the water remote from the container. By rotating the container through 180° the fuel assembly which it contains is inverted and becomes accessible for removal of the bottom nozzle. Facilities cooperative with the container and the assembly are provided for firmly supporting, positioning and aligning the fuel assembly while the nozzle is being conditioned for removal and is removed and after it is removed.

Also in accordance with this invention a weld cutting tool is provided for severing the welds of fuel assemblies whose thimbles are welded to the bottom nozzle plate by lock pins. This tool includes a cutter on a long floating shaft driven by a motor positioned at the work position remotely from the assembly. The cutter is advanced through the weld by a long feed shaft operated remotely by a feed thumb screw. The thumb screw rotation is calibrated in terms of cutter travel and is provided with a scale to indicate the travel as a function of rotation. This enables precise cutting depth to be achieved.

The cutting tool is positioned to cut each weld by a fixture including a bushing plate and indexing means. The bushing plate includes a plurality of bushings so positioned that when the bushing plate is secured to and aligned with the top nozzle, each bushing encircles a screw fastener and its welded lock-pin. Each bushing also seals the region around its screw fastener so as to capture the chips resulting from the severing of the weld. The indexing means includes a perforated plate assembly or separate plates which frames the bushing plate. The indexing means may be fabricated from a single plate. But in the interest of facilitating the understanding of this invention, it will be assumed that the indexing means consists of separate plates each extending along a side of the bushing plate. The cutting tool is positioned in different sets of holes in the framing plates, to cut the welds of different screw fasteners. The guide pins of the cutting tool enter a pair of holes in opposite plates and the cutting tool is secured in a pair of holes of the remaining opposite plates. The bushing plate has a threaded bushing which serves two purposes: to manipulate the fixture from a remote position by a long tool and to remove chips from the cutter by inserting the cutter in the inner (center) opening of the bushing and connecting a suction tube of an eductor to the outer opening.

A tool is provided for unscrewing the screw fasteners. This tool has a tip formed to engage the lock pins which were severed from the nozzle plate but remain in the slots of the screw fastener into which they were pressed.

An eductor is provided for removing chips from the region of the screw-fasteners and from the cutter and for removing the screw-fasteners that are disengaged from the thimbles. The eductor includes a pump which drives water through a long conductor, thence through a venturi to a separator. The venturi and the separator are under a substantial depth of water. The suction inlet of the venturi is connected to suction tube which is operable by a long handle guide so that it can be positioned to pick up chips.

For removal of a reconstitutable bottom nozzle which is secured by screw fasteners crimped to the nozzle plate another bushing plate is provided. This bushing plate carries bushings which, when the bushing plate is mounted on the nozzle, are at screw fastener locations so that they encircle the screws at these locations. At their inner ends the bushings are yieldable and are dimensioned to form an interference fit with the screw fasteners so that the screw fasteners, as they are unscrewed, are held by the bushing plate and may be dispersed of by being ejected from the bushing plate. The bushing plate also serves to replace the screw fasteners in the bottom nozzle when, after removal and replacement of fuel rods, the nozzle is secured to the fuel assembly. By use of this bushing plate a nozzle with crimped fasteners may replace a nozzle with welded lock pins.

A crimping plate is also provided for swaging or crimping the screw fasteners after the new fasteners are engaged with the thimbles. This crimping plate carries shafts to which crimping blades are secured. The shafts are so disposed on the crimping plate that when the plate is mounted on and aligned with the bottom nozzle, each crimping blade is positioned over a screw fastener location so that it can be brought into contact with the head of the fastener to crimp its skirt to the nozzle plate.

In carrying out the bottom nozzle removal operation the fuel-assembly rotating work station is temporarily placed in the refueling pit of a nuclear power plant in a convenient position for manipulating the fuel assembly; e.g., on the spent-fuel assembly shipping-cask laydown pad or in the fuel transfer canal. The depth of the water over the rotating station is sufficient to provide the necessary radiation shielding for fuel-assembly handling and fuel-rod removal and replacement. The technician and other personnel performing the removal and replacement of fuel rods, which is called reconstitution of a fuel assembly, operate from the deck of the spent-fuel bridge or from any other suitable platform placed directly above the rotating work station. The long handled equipment used in the reconstitutuion are supported from a crane or hoist or chainfall on the monorail of the bridge or on a monorail provided on a special platform.

In the use of the apparatus, the top end cap is removed from the container of the work station. The fuel assembly to be repaired or otherwise processed is placed upright in the container of the work station. This operation is carried out underwater but the bottom end cap of the container has holes so that the fuel assembly ejects the water through the bottom end cap as the fuel assembly is thrust into the cntainer. The top end cap is replaced on the container after which the container is rotated 180°. The bottom end cap is then removed from the container exposing the bottom nozzle of the fuel assembly. If the assembly is of the conventional style with weld-secured thimble screws, the long-handled cutting tool in conjunction with the indexing fixture, severs the thimble screw welds. Chips generated in the cutting operation are prevented from entering the fuel assembly by the fixture. These chips are subsequently removed and collected. The thimble screws are then un-threaded and removed by the eductor, and the nozzle is removed thus providing access for fuel rod removal.

Following the rod handling operations, a new reconstitutable bottom nozzle disclosed in the Shallenberger et al application is installed. The new thimble screws with integral locking cups are inserted, torqued into the thimbles, crimped, and inspected.

It is emphasized that the availability of the Shallenberger et al nozzle simplifies and facilitates the replacement of the bottom nozzle. The assembly is usually radioactively "hot" and must be reinstalled under a substantial depth of water. Because the Shallenberger et al nozzle is available the necessity of welding lock-pins to the bottom nozzle plate is dispensed with.

The bottom end cap is re-installed on the container and the container is rotated 180° to the upright position where the top end cap is removed. The repaired or processed fuel assembly is then withdrawn from the container and reinstalled in a reactor or otherwise handled.

In the event the damaged fuel assembly has been manufactured specifically for reconstitution, i.e., locking cups instead of welded pins on the thimble screws, the cutting operation is not required. In its place a long-handled tool, working through the bushing plate, overrides the crimped locking cup as it loosens and removes each thimble screw.

If the operation involves the transfer of intact irradiated fuel rods from a damaged skeleton rather than the removal of defective rods, two rotating work stations are employed. The second station houses a new skeleton into which rods from the damaged skeleton are transferred. The new skeleton is also set in the inverted position for receiving the irradiated fuel rods removed from the bottom end of the damaged skeleton in the first station. The new skeleton may contain dummy fuel rods, possibly only in every other grid cell location. Irradiated rods are first transferred into all vacant grid cells, then the balance of the rods are inserted on a one-for-one basis with the withdrawal of dummy rods to preclude the possibility of "cross-threading" rods into adjacent grid cells.

In plants where the cask laydown area has been held to the minimum size (10 ft.×10 ft. in cross-section) to maximize the spent fuel storage capacity there is insufficient space to rotate the 14 ft. long station while it is on the laydown pad. In these cases, after the fuel assembly is placed in the container, the station and its supporting frame are lifted to a raised stand or a special support plate on top of the spent fuel assembly storage racks where ample rotating space exists. At this level, there is still adequate water depth over the fuel to permit removal of the nozzle at this location. For fuel rod handling and the fuel assembly withdrawal after reconstitution, the station can be lowered onto the cask laydown pad.

BRIEF DESCRIPTION OF THE DRAWINGS

For a better understanding of this invention, both as to its organization and its method of operation, together with additional objects and advantages thereof, reference is made to the following description, taken in connection with the accompanying drawings, in which:

FIG. 5 is a view in front elevation of a work station in accordance with this invention;

FIG. 6 is a view in side elevation of the work station in the direction of the arrow VI of FIG. 5;

DETAILED DESCRIPTION OF THE INVENTION

Figure 1:
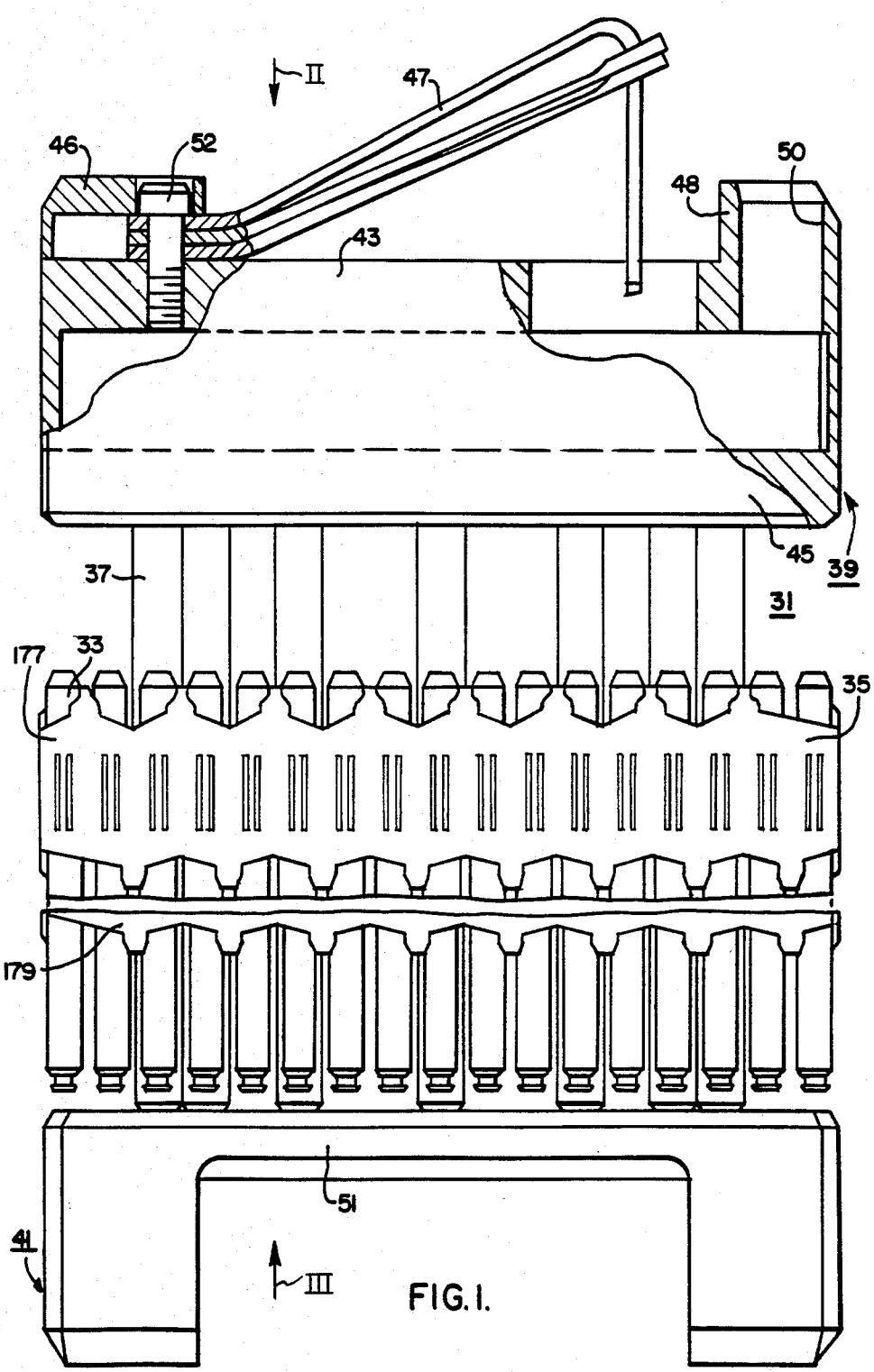
FIG. 1 is a view in side elevation of a typical fuel assembly, with the control rod cluster removed; the assembly being of the type in which the screw fasteners are crimped to the bottom nozzle plate.
Figure 2:
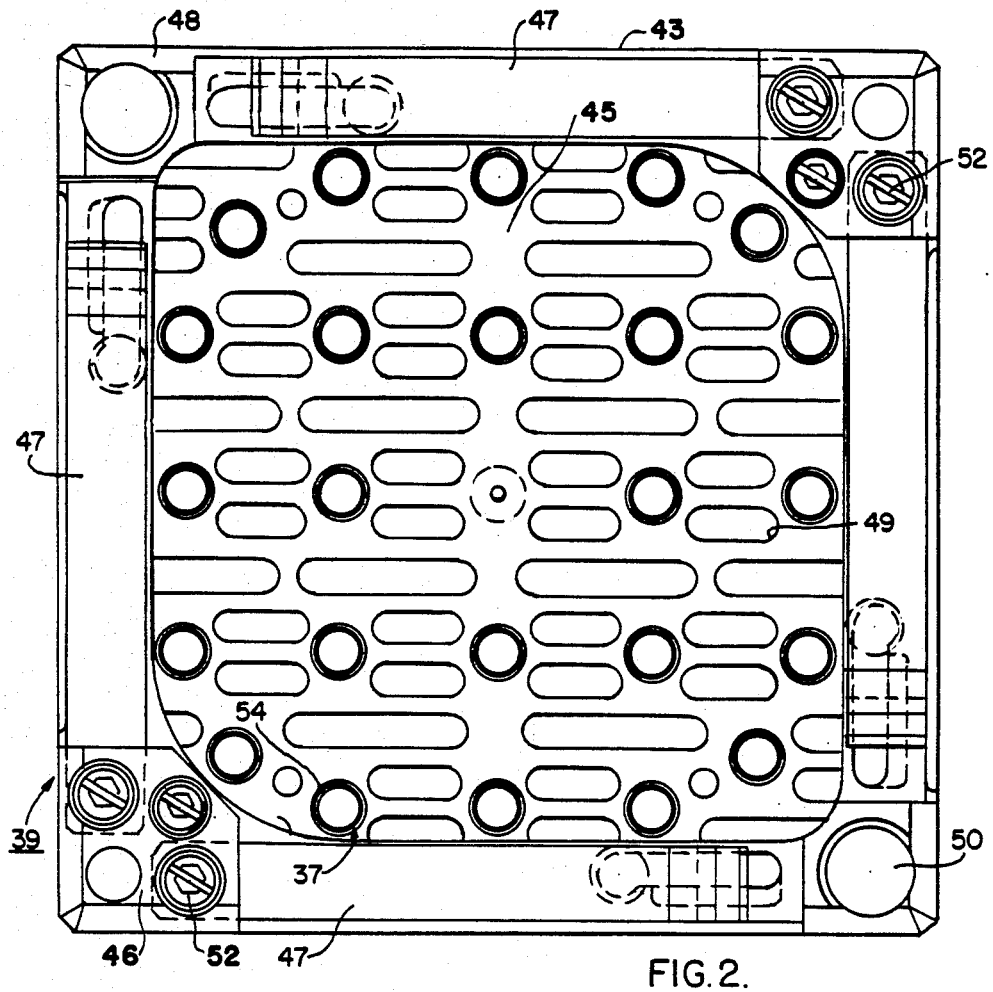
FIG. 2 is a plan view of the assembly taken in the direction of arrow II of FIG. 1, i.e., a plan view of the top nozzle of the assembly.
Figure 3:
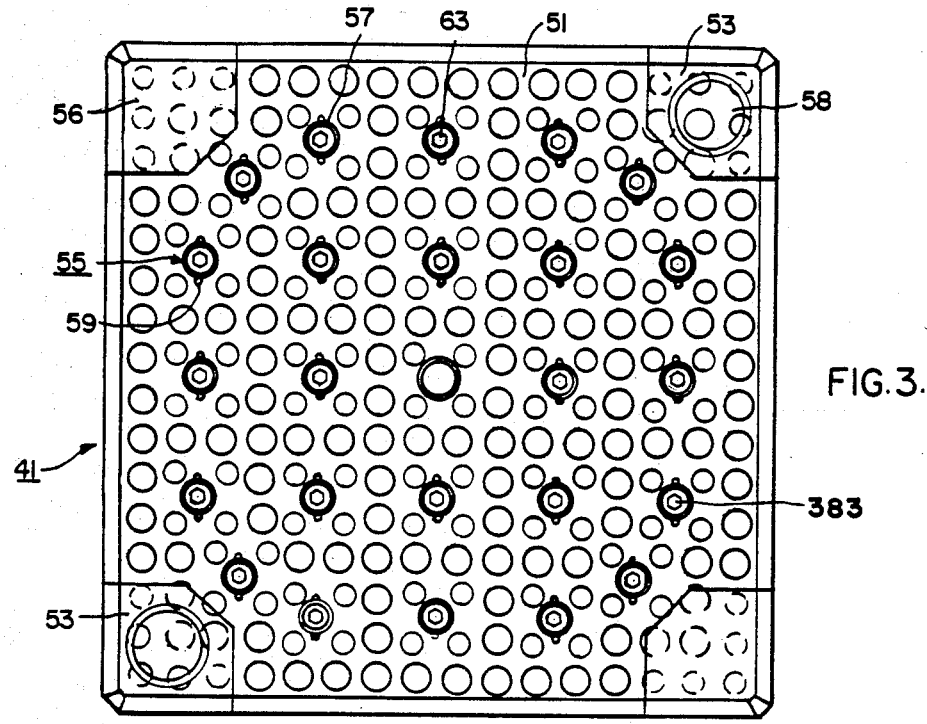
FIG. 3 is a plan view of the assembly shown in FIG. 1 taken in the direction of the arrow III of FIG. 1, i.e., a plan view of the bottom nozzle of the assembly.

A nuclear fuel assembly 31 of the type that is processed in the practice of this invention is shown in FIGS. 1, 2, 3. This fuel element includes a plurality of fuel rods 33 in a square array. The fuel rods are spaced by a plurality of grids 35. A typical grid structure is shown and described in U.S. Pat. No. Re. 28,079 to Edwards et al. The nuclear fission process is controlled by control rods (not shown) which are reciprocable in thimbles 37. The thimbles 37 are interspersed among the fuel rods 33. The fuel assembly includes a top nozzle 39 and a bottom nozzle 41. The top nozzle 39 and the bottom nozzle 41 are secured to the thimbles 37. The nozzles and thimbles form an integral assembly containing the fuel rods 33 which are held resiliently by the grids 35. The nozzles 39 and 41 like the array of fuel rods 33 are generally square in cross section (FIGS. 2, 3).

The upper nozzle 39 has an upper frame-like structure to which a lower adapter plate 45 spaced from the upper plate is connected. The upper plate 43 has feet or pads 46 and 48. Guide pin holes 50 extend into feet 48. Leaf springs 47 are secured by bolts 52 passing through the feet 46 and anchored in the upper plate 43. When the fuel assembly 31 is in position in the reactor (not shown) alignment guide pins (not shown) in the upper core plate (not shown) engage the hole 50 and the upper core plate engages the springs 47 and holds the assembly 31 in position. The lower adapter plate 45 has oval-shaped holes 49 through which the coolant which flows upwardly through the assembly exits.

Along its upper end each thimble 37 has a sleeve 54 (FIG. 2) which is joined to the adapter plate 45 and to the thimble by a circumferential weld. Below the welds the thimble and sleeve have outwardly projecting bulges (not shown) with the bulge in the thimble seated in the bulge in sleeve.

The top nozzles 39 are secured to the thimbles 37 as disclosed above in many if not most of the fuel assemblies 31 currently in use whether they be of the type whose lower nozzle 41 is secured by welded lock pins or by crimping. Top nozzles so secured are not readily removable and, when removed, are not readily replaceable. It is not practicable to remove the top nozzle.

The bottom nozzle 41 includes a nozzle plate 51 from which feet or pads 53 and 56 extend. The feet are shaped to rest on the bottom core plate (not shown) of the reactor (not shown). The feet 53 have holes 58 into which alignment guide pins (not shown) of the core plate extend. The force of the springs 47 acting against the top core plate and the bottom core plate hold the fuel assembly securely. The bottom nozzle 41 is secured to the lower end of each thimble 37 by a screw fastener 55 which is screwed into a sleeve (not shown) in the thimble and has a disk-shaped run 57 which is swaged or crimped into a groove 59 of the adjacent portion of nozzle plate 51. The screw fastener 55 has countersunk hole 63 for transmission of coolant and for taking up the forces applied when it is secured to the plate 51. The screw fastener and its relationship to the bottom nozzle 41 is described in more detail in the Shallenberger et al application.

Figure 19:
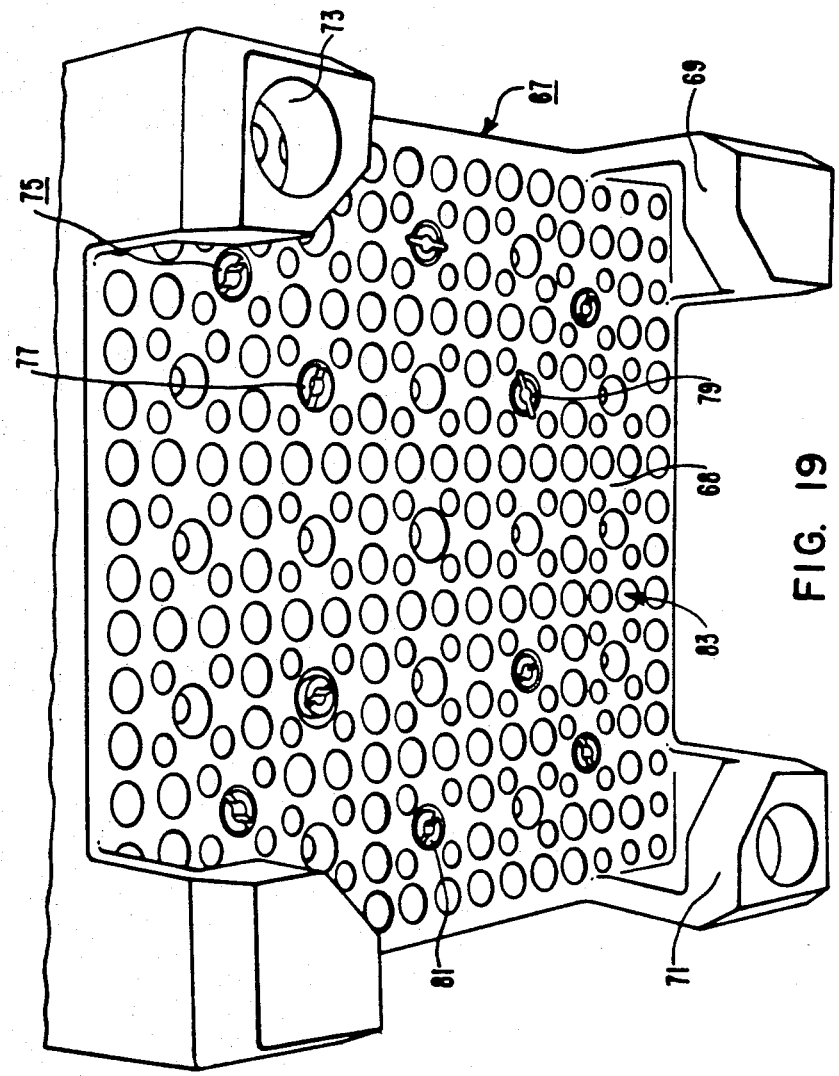
FIG. 19 is a copy of a photograph modified showing a bottom nozzle of the type in which the screw fasteners are secured by lock pins welded to the nozzle plate as seen from above the inverted fuel assembly.

The fuel assembly 31 in which the screw fasteners 55 of the bottom nozzle are crimped is shown here for illustrative purposes. The fuel assembly in which the screw fasteners include lock-pins welded to the nozzle plate differs from the fuel assembly shown in FIGS. 1, 2, and 3 only in the manner in which the nozzle is secured to the thimbles. A nozzle 67 of this type, which includes nozzle plate 68 and feet, 69 and 71 is shown in FIG. 19. Feet 71 have holes 73 for accommodating guide pins (not shown). The screw fasteners 75 of this nozzle 67 have slots 77 into which lock-pins 79 are pressed. The lock pins 79 are welded to the nozzle plate 68. The screw fasteners 75 have countersunk holes 81 in the center. The nozzle plate 68 has holes 83 for admitting coolant.

When a fuel assembly 31 is to be processed, it is typically placed in a rack 91 (FIG. 4) of a refueling pit 93 right-side up. The pit is filled with water 95 to a depth of 30 or 40 feet. For processing, the fuel assembly is removed right-side up by a crane 97 to the processing position. The crane 97 raises the fuel assembly right-side up. For processing it is necessary that the assembly be inverted. For this purpose a work station 99 is provided at an appropriate position in the pit 93.

The work station 99 (FIGS. 5, 6) includes a base 101 which is mounted on leveling pads 103. Tubular uprights or columns 105 and 107 of generally square cross-section are supported from the base 101. The columns have bearings 109 and 111 near their upper ends. The work station 99 also includes a container or can 113. The container 113 is of generally square cross-section and is dimensioned to accommodate the nuclear fuel assembly 31 with the nozzle 41 whose pins are locked by crimping or with a nozzle 67 whose pins are locked by welding. Stub shafts 115 and 117 are secured, typically by welding, to the container 113. These shafts are centered on the transverse center line 119 of container 113 and are rotatable on the bearings 109 and 111.

The shafts 115 and 117 and the container 113 to which they are secured are driven by a long drive shaft 121. The drive shaft 121 extends upwardly to the platform or work position (not shown) from which the work station is operable and is rotatable manually by a handle 123 through a worm gear drive 125. At its lower end the drive shaft 121 carries a hexagonal socket 127 which is engageable with, and disengageable from, the hexagonal tip on a stub shaft 129. An angle bracket 131 extending from the column 107 serves as thrust bearing for the stub shaft 129. The stub shaft 129 carries a bevel pinion 133 which meshes with a bevel gear 135 on shaft 117. The container 113 can be inverted by being turned slowly by means of handle 123 through a shaft 121 and bevel gears 133 and 135.

The container 113 when it contains a fuel assembly is balanced on shafts 115, 117 requiring a minimum of turning power in the water in which it is being rotated. Damage to the container by collision with an object which is inadvertently in its path is precluded because a very small resistance at the station, particularly at one or the other ends of the station, counteracts the rotating force and stops the container. A frame consisting of outrigger angles 137 and 139 extends from the columns 105 and 107. The purpose of this frame is to counteract forces or force couples tending to tip station 99 when the container 113 encounters a heavy object.

Figure 8:
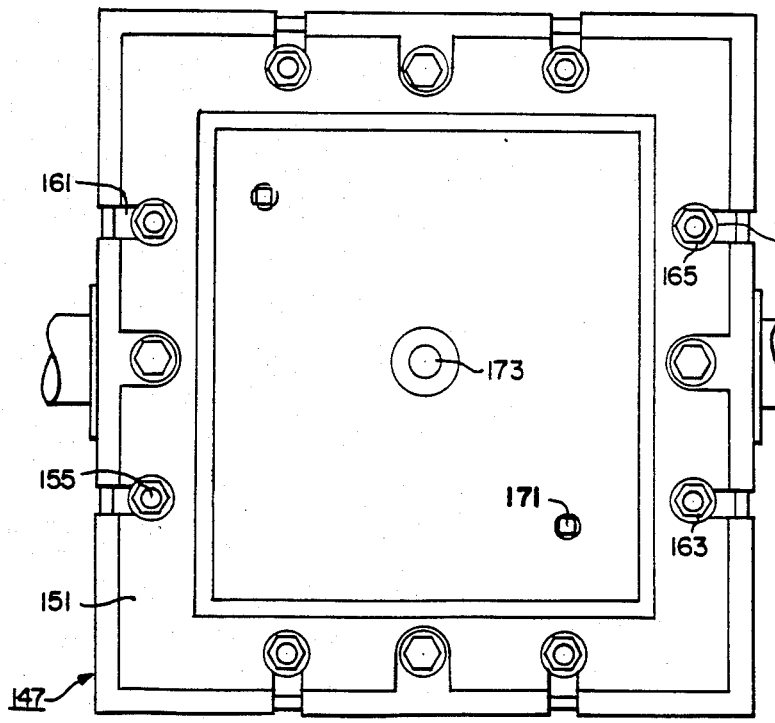
FIG. 8 is a plan view taken in the direction of the arrow VIII of FIG. 7.
Figure 7:
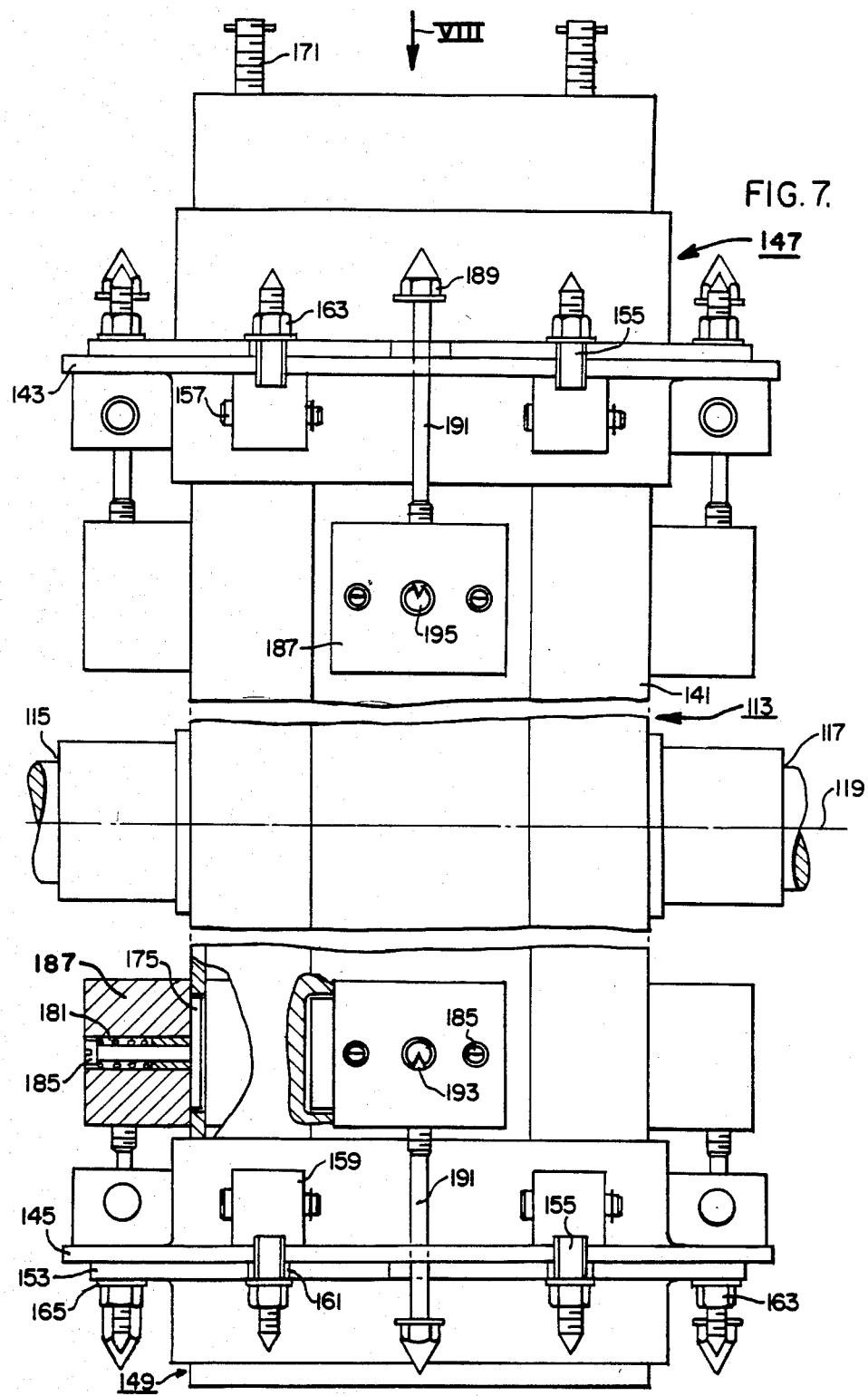
FIG. 7 is a view in side elevation of the container of the work station shown in FIGS. 5 and 6.
Figure 9:
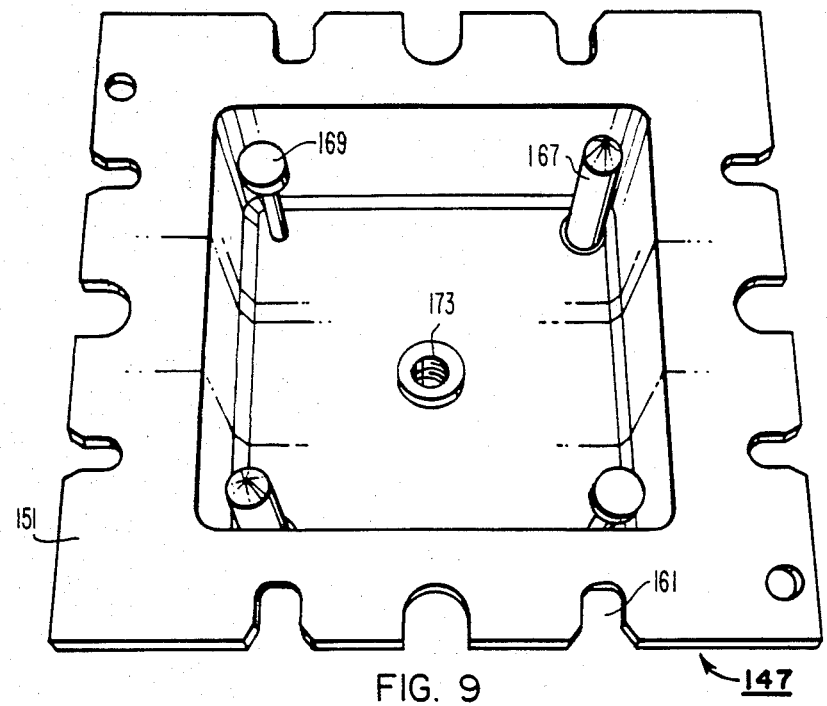
FIG. 9 is a copy of a photograph of the top cap of the container shown in FIG. 7 as seen from the inside of the container.
Figure 10:
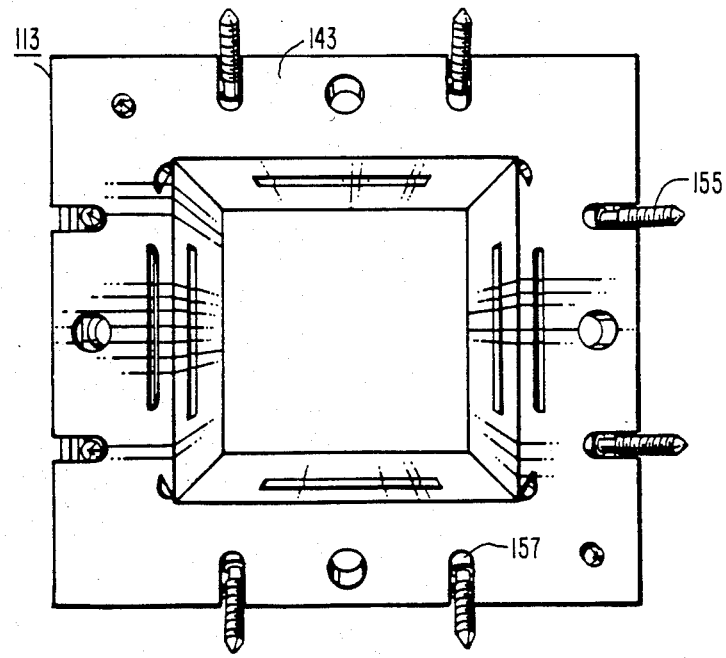
FIG. 10 is a copy of a photograph of the top of this container with the top cap removed.
Figure 11:
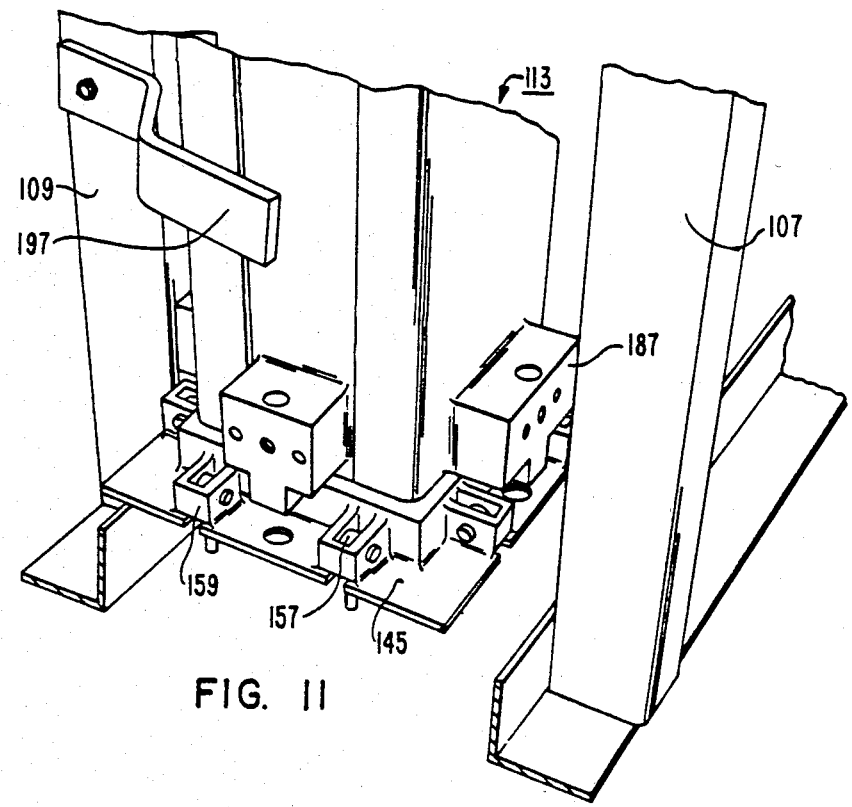
FIG. 11 is a copy of a photograph of this container as held by the lock bar which prevents its rotation.
Figure 17:
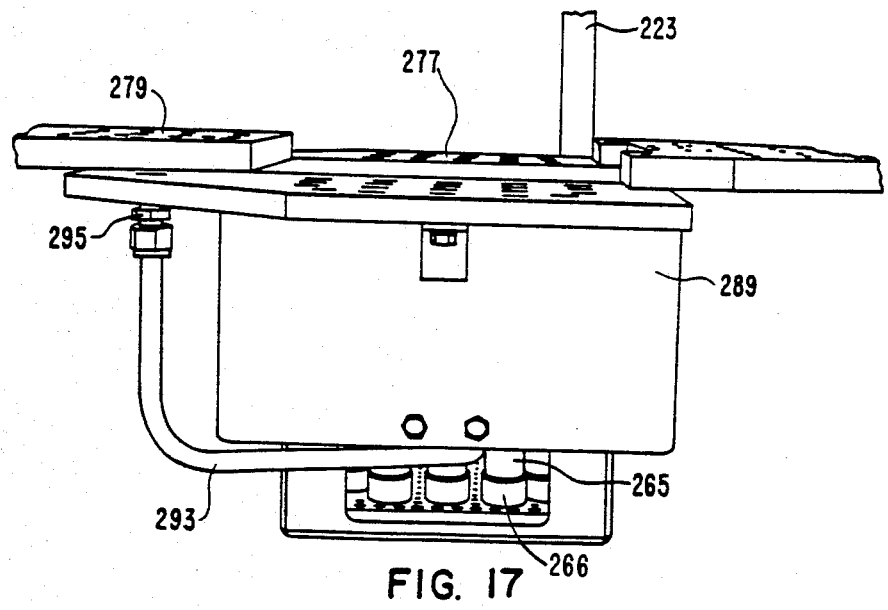
FIG. 17 is a copy of a photograph showing predominately the lower portion of this fixture and the connection of the conductor to an indexing plate so that this conductor is enabled to receive the eductor for removal of chips from the weld cutter.

The container 113 (FIGS. 7, 8) includes a tubular member 141 (FIGS. 7, 8, 9, 10) having top and bottom flanges 143 and 145. The container has top and bottom end caps 147 and 149 having flanges 151 and 153. The end caps are removably mounted on the flanges 143 and 145 with their flanges 151 and 153 in engagement with the flanges 143 and 145. The flanges are secured together by captive bolts 155. Each bolt 155 is pivotal on a pin 157 in a U-shaped support 159 which is secured to the face of the flange 143 or 145 that is opposite to the face engaged by the flanges 151 and 153. Each bolt 155 is swung through a slot 161 in the flanges 151 or 153 and secured by a nut 163 which acts against a washer 165. The top and bottom end caps 147 and 149 each has diagonally disposed guide pins 167. The guide pins 167 engage the holes 50 and 58 (FIGS. 2 and 3) in the top and bottom nozzles 39 and 41 of the fuel assembly 31 (FIGS. 2, 3) and align this assembly in the container 113. The top end cap 147 has diagonally disposed axial pressure pads 169. The pads 169 extend through the end caps 147. At the end inner they bear against the pads or feet 48 of the upper nozzle 39 and preclude axial motion of an assembly 31 in container 113. The pads 169 are axially adjustable by pins 171 (FIG. 7). The top end cap has a central threaded bushing 173. A long tool with a threaded end is available for engaging the end cap in this opening and manipulating it. Lateral stabilizing pressure is impressed on the fuel assembly 31 in container 113 by pads 175. Pads 175 (FIG. 7) exert horizontal pressure on the four outside surfaces or straps of the top and bottom grids 177 and 179 (FIG. 1) of a fuel assembly in the container 113. Each pad 175 is disposed in a slot in container 113. It is urged into engagement with fuel assembly by springs 181 which are adjustably compressed by retainer screws 185. The spring and screws are in a block 187. Horizontal pressure is exerted by pad 175 on a fuel assembly by turning a vertical screw 191 with a long-handled tool (not shown) having a hexagonal socket engageable with the hexagonal head 189 of the screw. The end 193 of the screw 191 is tapered and engages a similar angled surface at the end of a guide shaft 195 which extends into the block 187. By turning the screw 191 in one direction or the other, the pad 175 may be moved inwardly or outwardly. The pads 175 prevent movement of a fuel assembly when an end cap 147 or 149 is removed and, also, maintains skeleton squareness in the container 113 when the bottom nozzle is removed. A pivotal gravity-drop lock bar 197 (FIG. 11) operated by a cable 199 engages the container 113 on opposite sides and prevents inadvertent motion of the container when it is upright or inverted.

Figure 4:
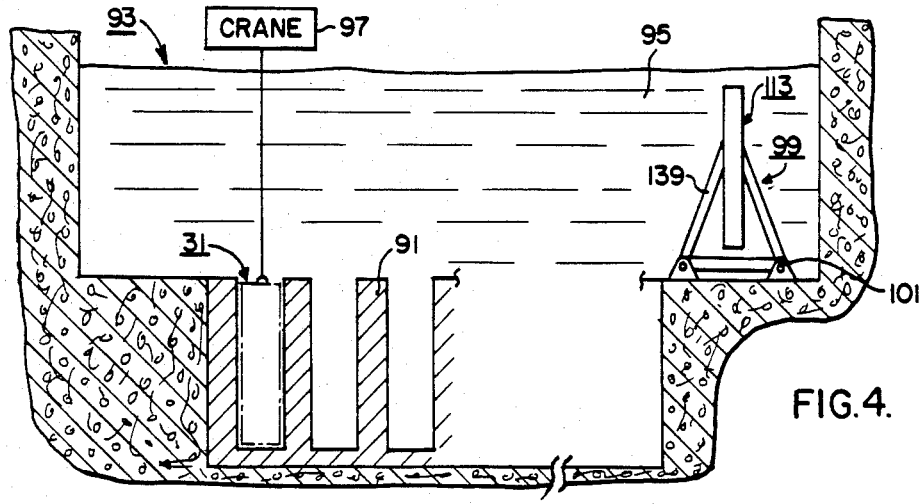
FIG. 4 is a diagrammatic view of the refueling pit of a nuclear reactor plant, with walls and other parts in longitudinal section showing the storage racks for the fuel assembly and their relationship to a work station in accordance with this invention.

The cutting tool 203 (FIGS. 12, 13) for the welds of the lower nozzle 67 (FIG. 19) with the welded lock-pins 79 includes a cutter 205 mounted on a spindle 207. Typically the cutter 205 is of the trepan 4-flute type. The cutter 205 is rotated by a gear motor 209 mounted on a bracket 211 on a hoist of the operator bridge of a crane (not shown) at the work position above the pit 93 (FIG. 4). The output shaft (not shown) of the motor 209 drives an adapter 213 through a square (or hexagonal) pin 215. At its lower end the adapter 215 has a square socket 217 which is engageable by the square end 219 of a long drive shaft 221. The end 219 is slidable upwardly and downwardly in the socket 217 over a short vertical distance so that over this short distance the shaft 221 floats. A long sleeve 223 having a flange 225 at its lower end extends integrally from the bracket 211. The floating shaft 221 extends through the sleeve 223 and is rotatable in a bearing 227 in the flange 225. Below the flange 225 there is an annular feed plate 229. The feed plate 229 also has a bearing 231 in which the shaft 221 is rotatable. The feed plate 229 is slidable on a guide pin 233 extending from the flange 225. The spindle 207 is connected to the shaft 221. The feed plate 229 bears on a collar 235 on, and rotatable with, the shaft. There is a split retaining ring 237 in a groove on shaft 221 above the feed plate 229. This split ring traps the feed plate bearing 231.

The cutter 205 is advanced in engagement with a weld to be severed and also retracted by a long feed shaft 239. The feed shaft 239 is operable by a thumb screw 241 at the work position. At its lower end the feed shaft 239 passes slidably through the flange 225 and engages the feed plate 229. Rotation of the thumb screw 241 in one direction, for example clockwise, advances the shaft 221 advancing the cutter 205 through the weld. Rotation of the thumb screw 241 in the opposite direction; e.g., counterclockwise, retracts the feed plate 229. Because the feed-plate bearing 231 is trapped by the split ring 237, the shaft 221 and the cutter 205 are also retracted when the thumb screw is turned counterclockwise. The rotation of the thumb screw 241 is calibrated in terms of travel of cutter 205 enabling precise cutting depths to be achieved.

Figure 12:
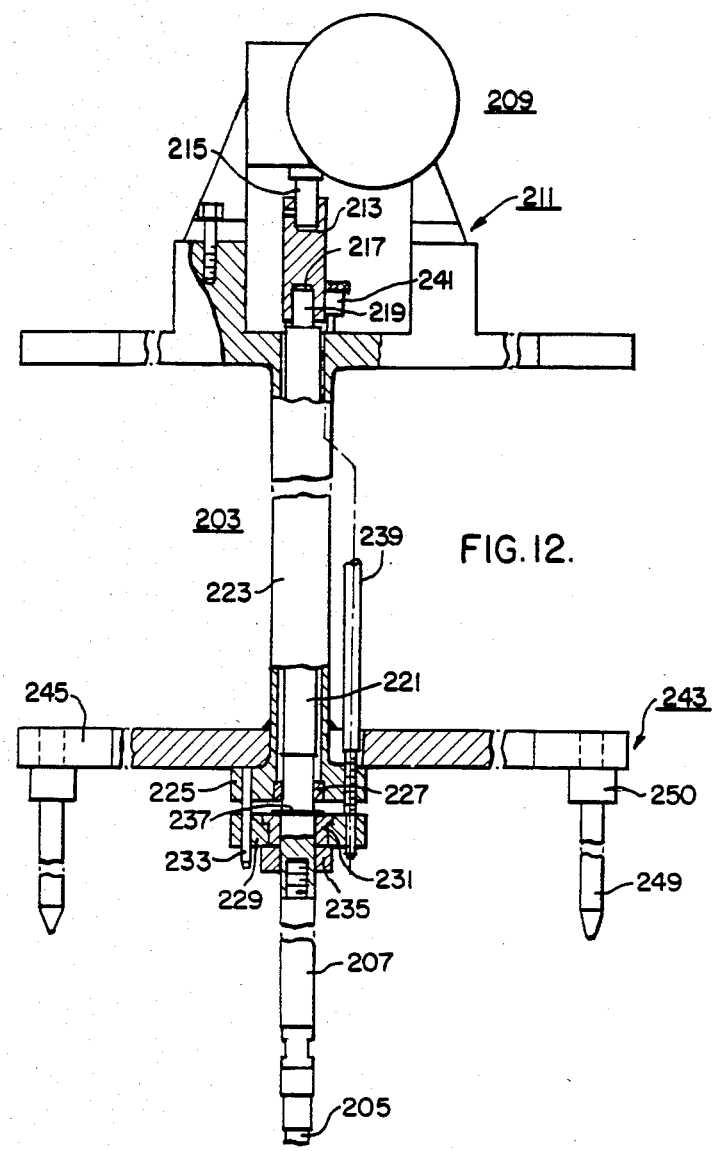
FIG. 12 is a view in side elevation partly in longitudinal section of the cutting tool for cutting the lock-pin welds securing the bottom nozzle of fuel assemblies of the type in which such welds are included.
Figure 13:
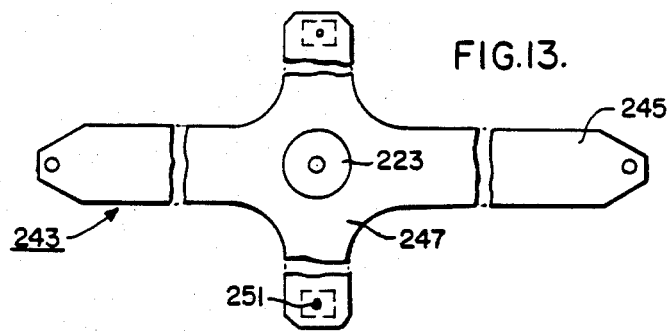
FIG. 13 is a plan view of the cross member of this tool.

A cross member 243 FIGS. 12, 13 is secured to the sleeve 223 just above flange 225 typically by a circumferential weld. The flange 225 lends support to the cross member. The cross member 243 has a pair of opposite arms 245 and another pair of arms 247 generally at right angles to the arms 245. Guide pins 249 are suspended from the arms 245 and captured hold down screws 251 are suspended from the arms 247. Eah pin 249 has a head 250 of substantially enlarged diameter. Th guide pins 249 serve to position the cutting tool 203 in each setting into which it is indexed in cutting engagement with the respective welds, and the hold down screws 251 lock the cutting tool 203 in these positions and enable the tool to take up the reactive force from the cutting.

In the use of the cutting tool, the bracket 211 and the parts mounted on it including the motor 209 and the thumb screw 241 are above the pit 93. The cross member 243 and the parts below it are underwater at a substantial depth in working relationship with the work station 99. The screws 251 are tightened from the position above the pit by a long-handled socket tool.

Figure 14:
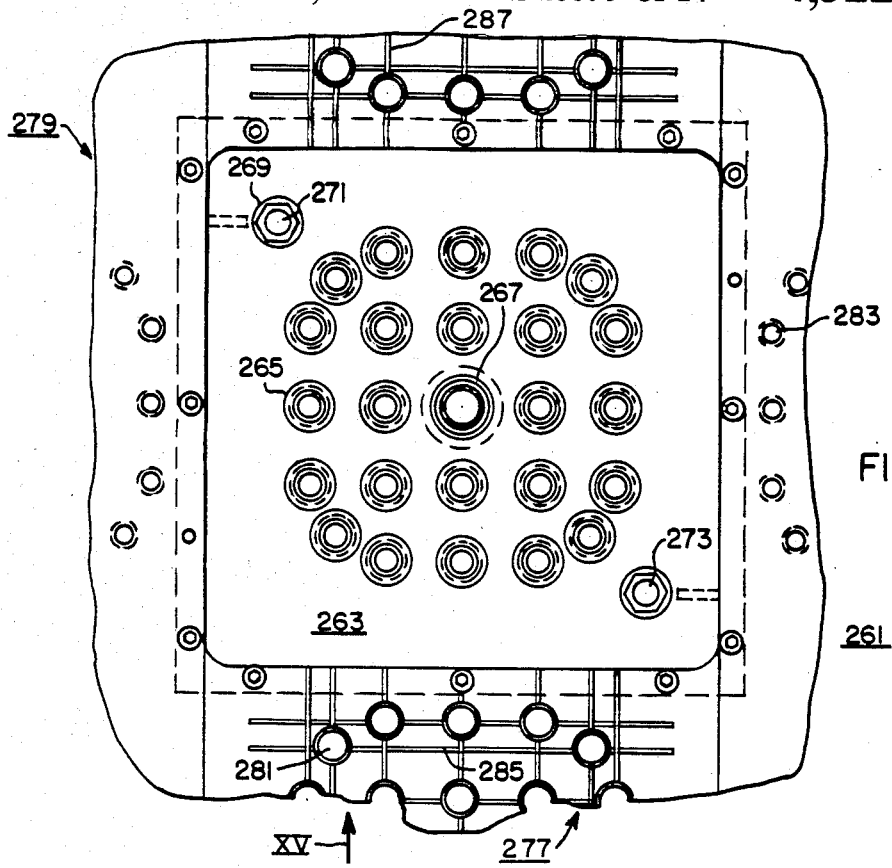
FIG. 14 is a fragmental plan view of the fixture for positioning and guiding the cutting tool shown in FIGS. 12 and 13.
Figure 15:
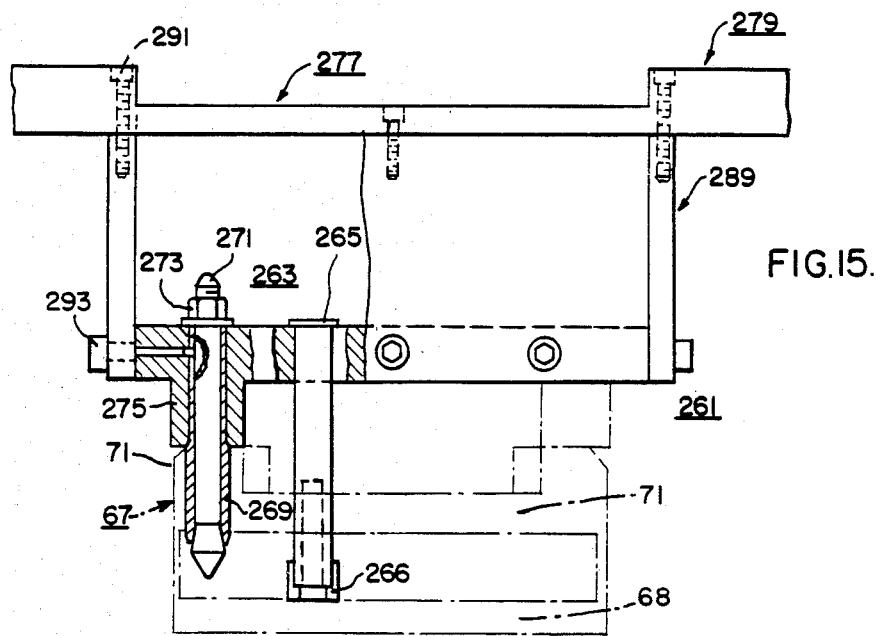
FIG. 15 is a fragmental view in side elevation and partly in longitudinal section taken in the direction of the arrow XV of FIG. 14.
Figure 16:
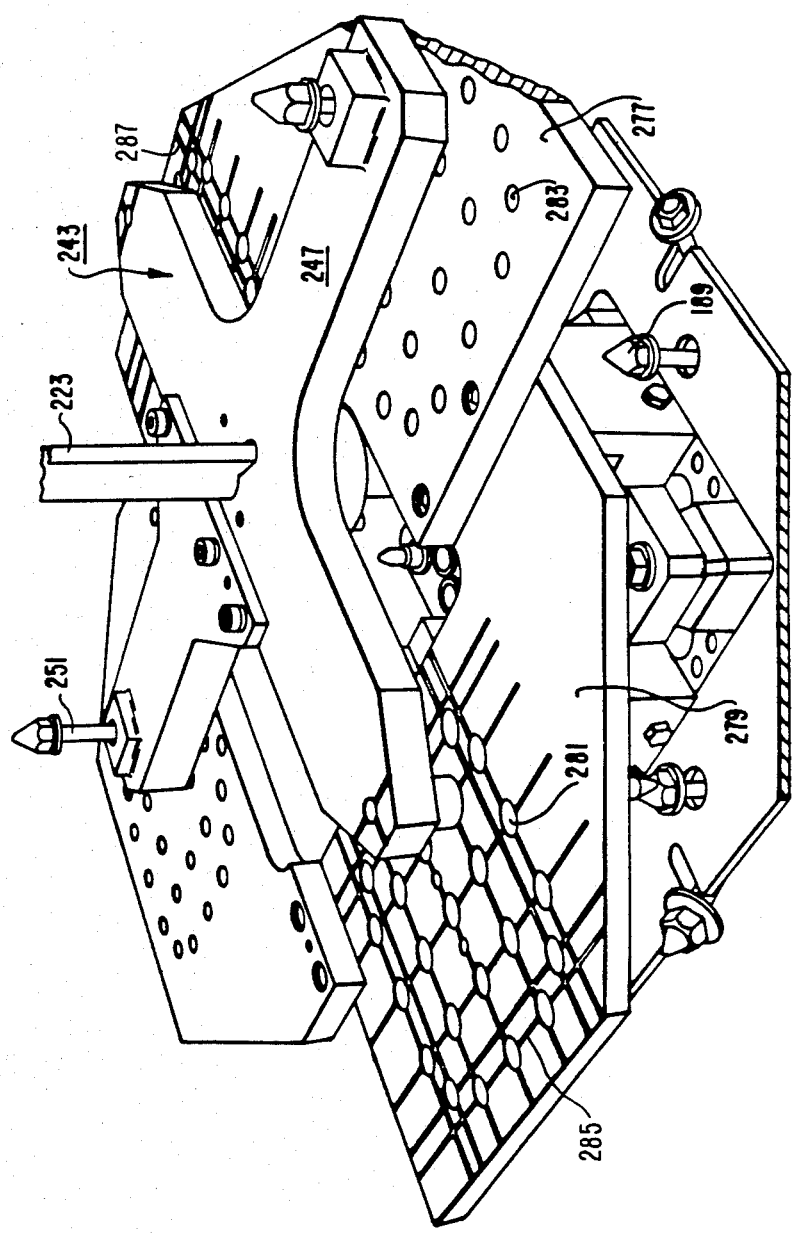
FIG. 16 is a copy of a photograph showing the relationship between the weld-cutting tool shown in FIGS. 12 and 13 and the fixture shown in FIGS. 14 and 15.
Figure 17A:
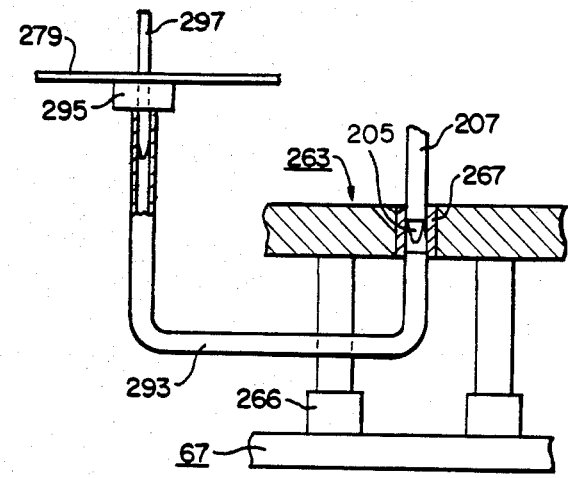
FIG. 17A is a diagrammatic view showing the manner in which this conductor is connected to a bushing of the framed plate of this fixture.

The weld cutting tool 203 is positioned in cutting relationship with the welds in nozzle plate 68 (FIG. 19) with the aid of a fixture 261 (FIGS. 14, 15, 16, 17, 17A, 18). This fixture 261 includes a bushing plate 263 in which there are a plurality of bushings 265 corresponding in number and position to the welds to be cut. Each of these bushings 265 has at its lower end a sleeve 266 of yieldable material, typically of polyurethane. There is also, typically, in the center of bushing plate 263, a bushing 267, typically of bronze, having a tapped through hole (FIGS. 14, 17A). This bushing 267 may be engaged by a long-handled tool threaded at the end for manipulating the bushing plate 263 and the fixture 261 as a whole from a work position above the pit 93. The bushing plate 263 has, at its diagonal corners, split sleeves 269 and a wedge pin 271 for expanding the split sleeves 269 when a nut 273 is tightened. The bushing plate 263 has feet 275 through which the wedge pins 271 and the sleeves penetrate. In use the fixture 261 is mounted on the lower nozzle 67 with the feet 275 in engagement with the feet 71 of the nozzle. The split-sleeve wedge-pin units 269–271 enter the guide-pin holes 73 (FIGS. 15, 19) in the feet 71 of the nozzle 67. When the nut 273 is tightened, the bushing plate 263 is locked to the bottom nozzle 67 with each polyurethane sleeve 267 encircling and sealing the region of a weld of a lock-pin 79 to the nozzle plate 68.

The bushing plate 263 is framed by raised, oppositely disposed, pairs of indexing plates 277 and 279. The reference here to oppositely disposed pairs of plates is used in the interest of facilitating the explanation of this invention. In actual practice the raised frame may be a single plate having four sections, the inner side of each section being vertically above and generally parallel to a corresponding side of the bushing plate 263. Each indexing plate 277 and 279 has a pattern of holes 281 and 283 substantially identical to the pattern of the thimblescrew-fastener (75 FIG. 19) and lock-pins (77) in the nozzle plate 68. The holes 281 in opposite plates 277 receive the long bullet-nosed guide pins 249 (FIG. 13) in the arms 245 of cross members 243. The holes 283 (FIG. 14) are tapped. The captured hold-down screws 251 in arms 247 are secured in these holes. In each indexed position of the cutting tool 203, these screws take up the reactive forces of the cutting tool.

A coordinate system of connecting yellow-painted lines 285 and 287, or lines of any other readily visible color, identify the centers of the holes 281 for the guide pins 249 and aid in the positioning of the cutting tool 203. Similar lines (not shown) on the top surfaces of the guide pin legs locate the center of each bullet-nosed pin.

Figure 18:
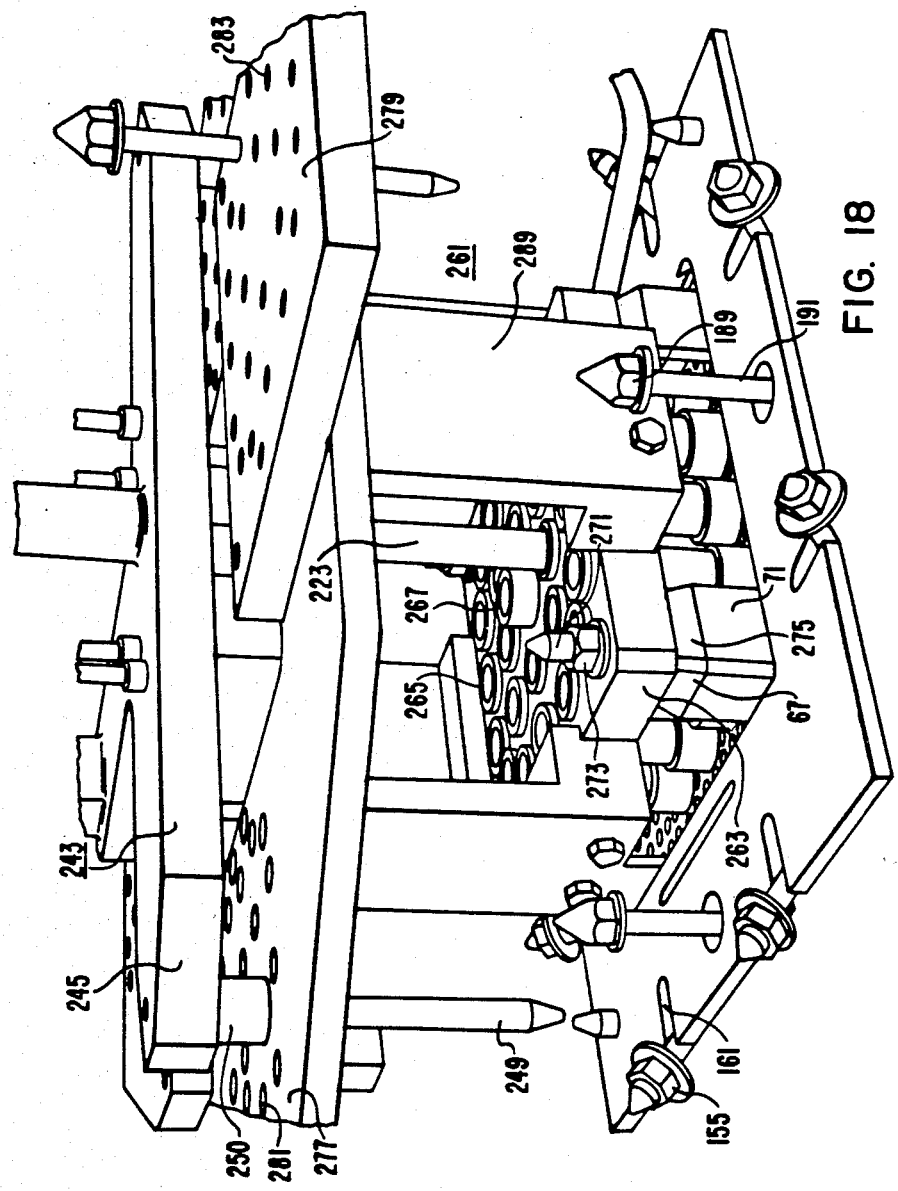
FIG. 18 is a copy of a photograph of the lower portion of this fixture and of the bottom nozzle showing how the fixture is mounted on the bottom nozzle.

A metal shroud 289 completely encloses the space between the bushing plate 263 and the raised plates 277 and 279. The shroud insures that any chips from the welding which escape the sleeves 266 remain in the fixture 261 until removed by the eductor. The shroud is secured to the plates 277 and 279 by the vertical bolts 291 and to the bushing plate 263 by the horizontal bolts 293. FIG. 18 shows only single plates of the shroud on each side of the enclosed space.

Figure 21:
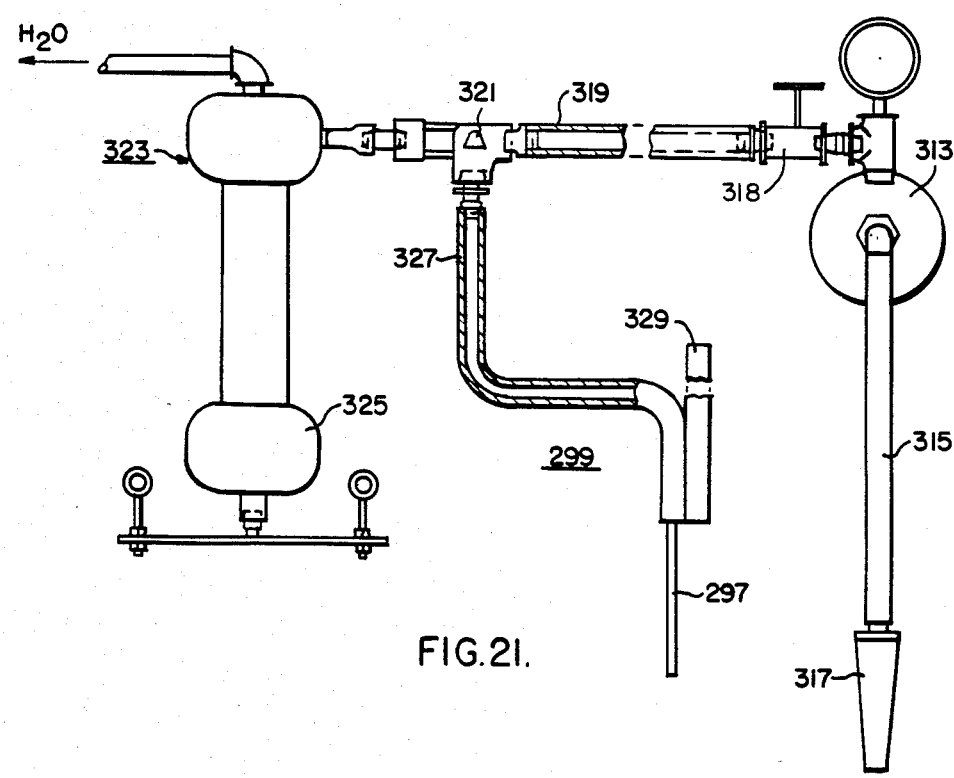
FIG. 21 is a diagrammatic view showing the eductor which serves to remove chips from the severed weld region and also released screw fasteners.

The central bushing 267 (FIG. 14) serves another purpose in addition to its use in manipulating the fixture 261. The weld material which joins the lock-pins 79 to the plate 69 is austenitic and therefore non-magnetic. The cutting of the welds transforms this material into ferritic molecular structure and it becomes magnetic and some of the chips adhere to the cutter 205. The bushing 267 affords a facility for removing these adhered chips. A tube 293 (FIGS. 17, 17A), extending between a fitting 295 under one of the indexing plates 279 and the lower opening in the bushing 267, connects this bushing to an auxiliary hole in the plate 279. To remove the chips adhered to the cutter 205, the cutter is inserted in the upper opening in the bushing 267 and the suction tube 297 of an eductor 299 (FIG. 21) is inserted in the hole in the plate 279. The chips are sucked from the cutter 205 by the eductor.

Figure 20:
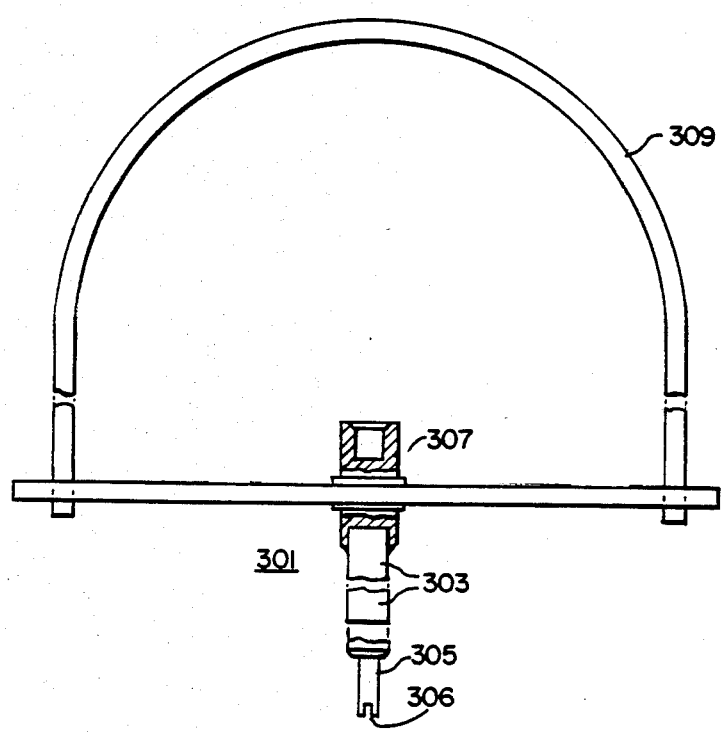
FIG. 20 is a view in side elevation, with a part in longitudinal section, showing the tool for removal of the screw fasteners which had been joined to the nozzle plate by welds after the welds are severed.

To remove the screw fasteners 75 after the welds are cut a long-handle tool 301 (FIG. 20) is provided. This tool includes a long handle 303 (about 18 or 20 feet long or longer) in whose outer end a split-end head 305 of a high-strength material of high-toughness is engaged. The head 305 has a saddle-shaped tip 306 which fits over and engages the lock-pins which are pressed into the slots in the heads of the screw fasteners 75. The handle 303 terminates at the top in a square socket 307 to be engaged by a wrench. The socket is welded to the handle. There is a handling bail 309 in the form of a loop with a bar across its open end. The bar extends through the socket 307. Positive guidance of the tool 301 is achieved by lowering the tool through each bushing 265 in the bushing plate 263 in its turn until the end 306 contacts the lock-pins 79 enclosed by the bushing. Then the tool 301 is turned slowly until the end 306 drops over the pin 79 into the countersunk hole 81 and there is resistance to turning. Breakaway torque is applied by a torque wrench inserted into socket 307.

The eductor 299 (FIG. 21) of the water-jet type and includes in addition to the suction tube 297 an electrically driven pump 313. This pump is located at the work position above the pit 93 (FIG. 4). It includes a pump suction line 315 connected to a foot valve 317 which is maintained in the water 95. The pump 313 is connected, through a valve 318 and a long water conductor 319, to a venturi 321. There is a T junction at the venturi 321 including the conductor 319 as one arm. The opposite arm of the T is connected to a cyclone separation 323. The stem of the T is connected to the suction tube 297 through the conductor 327. The cyclone separator 323 includes a container 325 in which the chips separated from the water are deposited. The cyclone separator, the venturi 321 and the suction tube 297 and the conductor 327, connecting the suction tube to the venturi, are at a substantial depth below the work position. The suction tube is operated from the work position by a long-handled guide 329. The water forced through the venturi by the pump 313 produces a suction force in the suction tube 297.

In the use of the apparatus, after each weld cutting operation, the cutter 205 is inserted in bushing 267 (FIGS. 14, 17, 17A) and the suction tube 297 is inserted in the opening in indexing plate 279 to which tube 293 is connected. The pump 313 is enabled and the chips are removed from cutter 205 and deposited in container 325. The cutting tool 203 is then operated to cut a succeeding weld and the above steps are repeated to remove the chips from the cutter 205. After all the welds have been cut, the suction tube is inserted in each bushing 265 (FIGS. 13, 14) in its turn and the chips captured by the sleeves 266 are removed to the container 325. The suction tube 297 also removes chips trapped in the shroud 289. Next the screw fasteners 75 are unscrewed from the thimbles. The suction tube 297 is then again inserted in the bushings 265 and the pump 313 is enabled. The suction tube picks up the screw fasteners 75, at each thimble position and deposits it in a facility underwater which suppresses the radiation from them. The bottom nozzle 67 may then be removed and the fuel rods processed as required.

Figure 22:
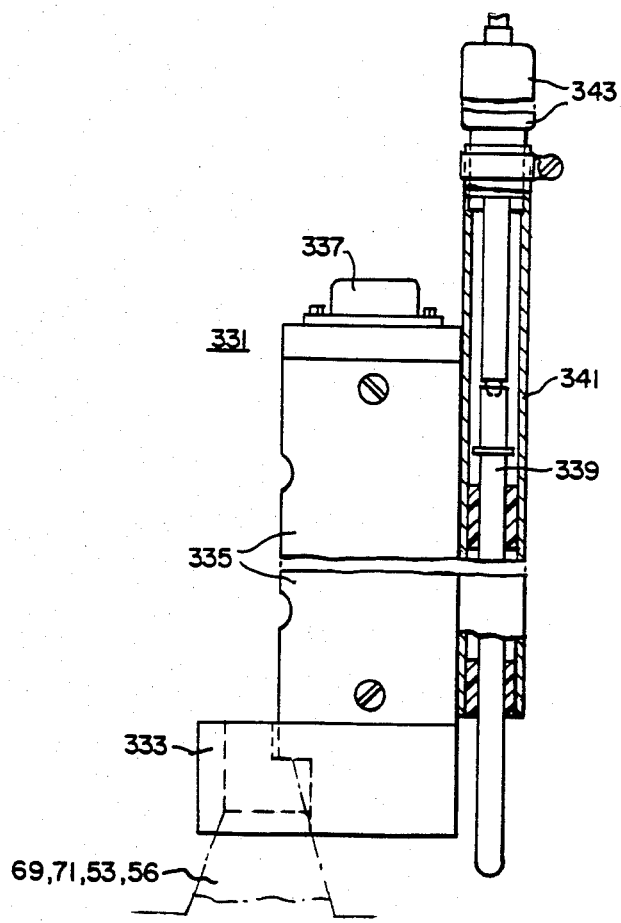
FIG. 22 is a view in side elevation and partly in section of and instrument for determining the attitude of a bottom nozzle which is to be removed.

Before the bottom nozzle 67 is removed its attitude is determined with attitude measuring apparatus 331 (FIG. 22). This apparatus includes a stepped base plate 333 dimensioned to engage the feet 69 and 71 of the nozzle 67 (FIG. 19) or the feet 53 and 56 of the nozzle 31 (FIG. 3). The base plate 333 has a surface which seats on the surface of the engaged foot. A support 335 extends from the stepped base plate 333 to the work position. The support 335 has a baffle level 337 which enables the operator to determine if the base is properly positioned. There is also a movable rod 339 in a sleeve 341 which is suspended from the support 335. The rod and sleeve extend to the work position where they terminate in an indicator 343 actuable by the rod. The base plate 333 is placed over each foot 69, 71 or 53, 56 while the rod is in engagement with the nozzle plate 68 or 51. By comparing the indicator readings for the four feet, the attitude of the nozzle is determined. The replacement nozzle should be mounted at the same attitude.

Figure 24:
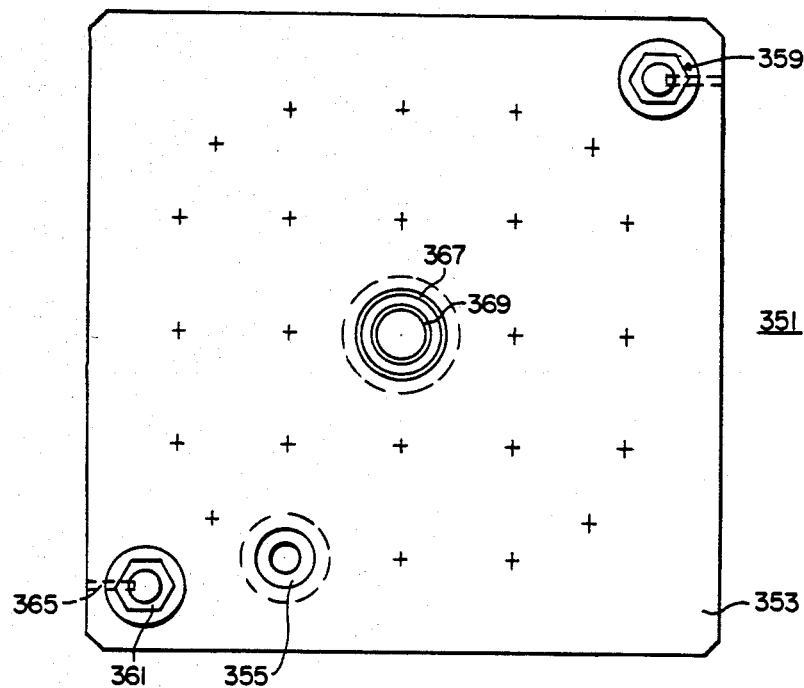
FIG. 24 is a plan view of this fixture taken in the direction of the arrow XXIV of FIG. 23.
Figure 23:
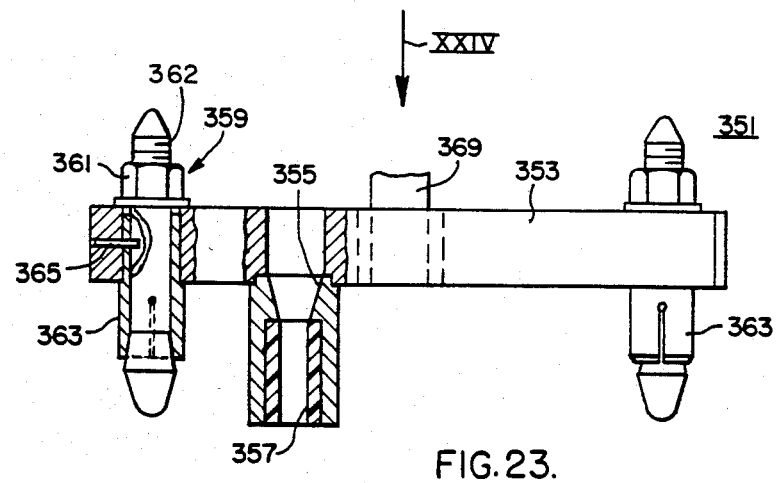
FIG. 23 is a view in side elevation and, partly in longitudinal section, of a fixture for guiding a tool for removal and replacement of screw fasteners of bottom nozzles of the type that are crimped to the nozzle plate.

If the bottom nozzle which is removed is a welded nozzle, it is replaced by a reconstitutable nozzle 41 shown in FIG. 3 and disclosed in the Shallenberger et al application. The advantage of this practice is that it dispenses with the necessity of welding lock-pins 79 underwater at a great depth. In this case, the removed welded nozzle is stored in the pit 93. For replacing a removed welded nozzle by a new reconstitutable nozzle or for removing and reinstalling a reconstitutable nozzle, a fixture 351 is provided (FIGS. 23, 24). This fixture includes a bushing plate 353 having a plurality of funnel-shaped bushings 355. The number and positions of these bushings 355 correspond to the number and positions of the thimbles to be secured to the nozzle plate 51. A yieldable inner sleeve 357 typically of polyurethane extends through the lower portion of each bushing. The sleeve 357 forms a yieldable interference fit with the screw fasteners 55 (FIG. 3). At its diagonal corners the bushing plate 353 has wedge-pin-expanded split sleeves 359. These devices are inserted in the holes 58 in the feet 53 of the nozzle 41. When the nuts 361 are tightened on screw 362 the sleeves 363 are expanded and secure the fixture 351 to, and align the fixture with, the nozzle. A pin 365 extends through the plate 353 and the device sleeve 363 and prevents the device 359 from being rotated when the nut 361 is tightened. The pin 365 should engage the wedge pin 362 in a slot so as to permit upward or downward movement of the wedge pin. With the fixture 351 mounted on the nozzle 41, the bushings 355 are centered over the thimbles 37 when the nozzle 41 is appropriately mounted on the fuel assembly 31. The fixture also has a central bronze bushing 367 which is tapped. A long-handled tool 369 with a threaded end is engageable with this bushing 367 and serves to manipulate the fixture 351 and a nozzle which may be secured to it.

In use in the removal of screw fasteners 55 (FIG. 3) from a nozzle 41, the fixture 361 is appropriately positioned over the nozzle with the aid of the long-handled tool 369. The fixture is aligned with and secured to the nozzle by expanding the split sleeves 363 in the holes 58.

Figure 25:
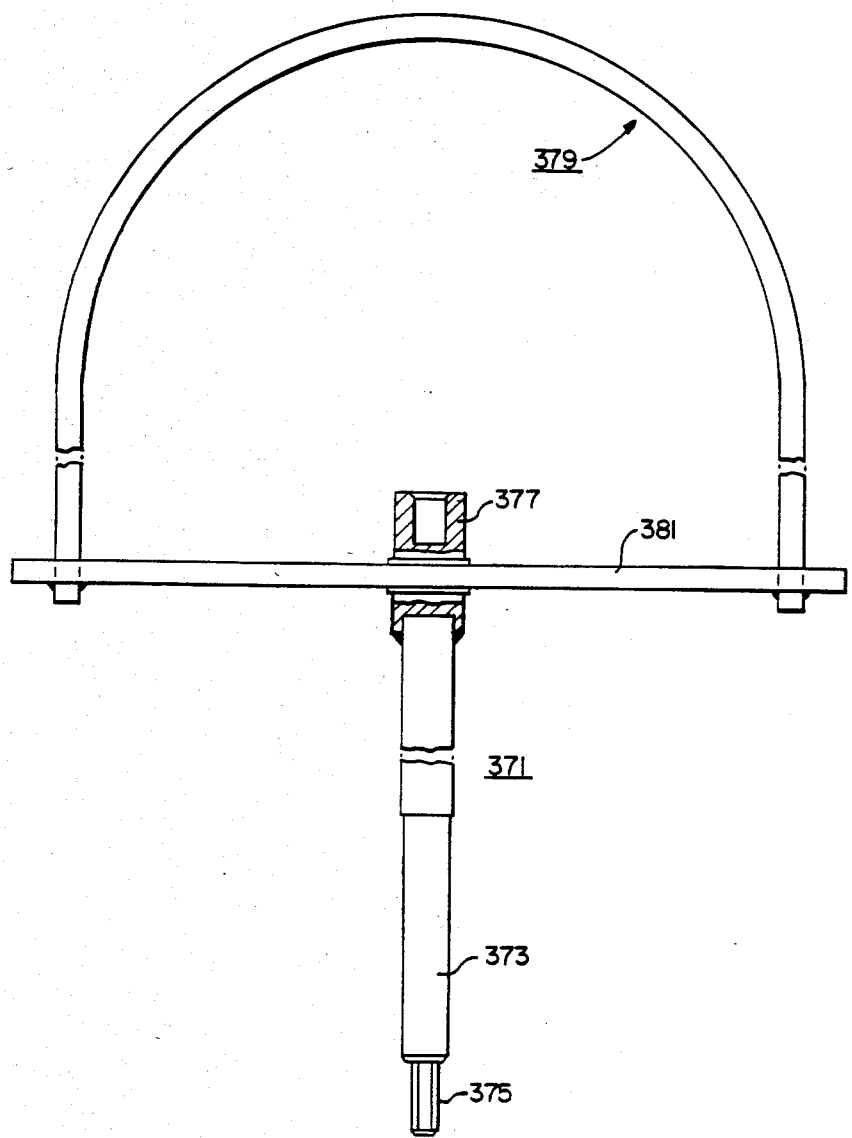
FIG. 25 is a view in side elevation, partly in section of a tool for removing crimped screw fasteners from the thimbles of a fuel assembly and installing fasteners to be crimped in this assembly.
Figure 27:
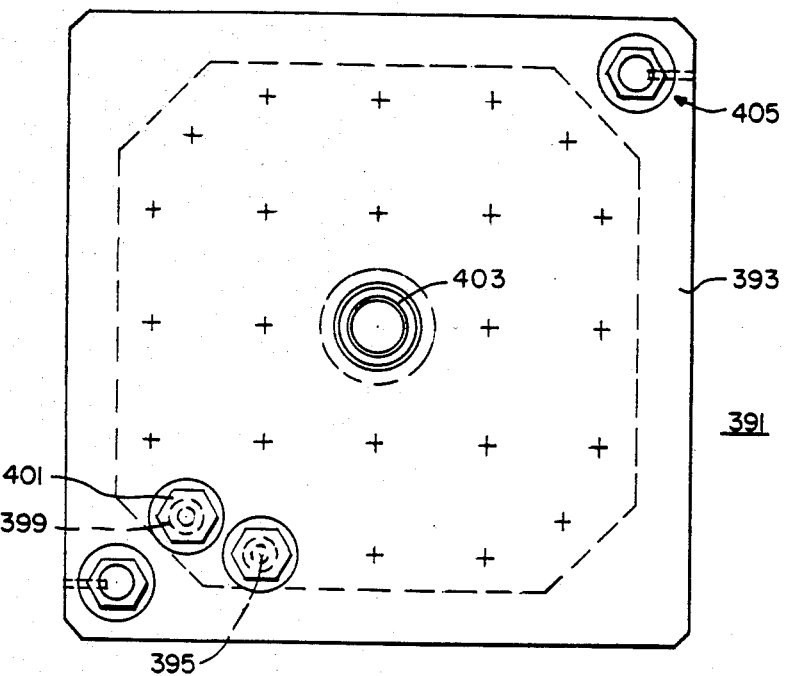
FIG. 27 is a plan view of this fixture taken in the direction of the arrow XXVII of FIG. 26.
Figure 26:
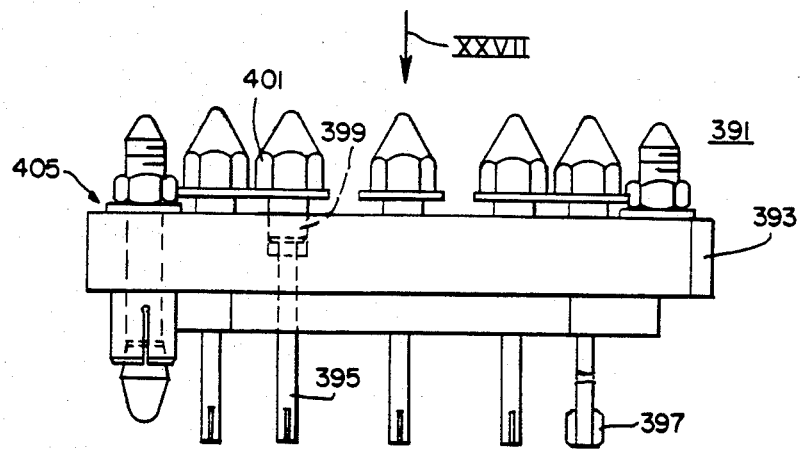
FIG. 26 is a view in side elevation of a fixture for crimping screw fasteners, screwed into the thimbles of a fuel assembly, to the bottom nozzle plate.

To release the screw fasteners 55 the tool 371 (FIG. 25) is provided. This tool includes a long handle 373 carrying at its lower end a hexagonal head 375 of high strength and high toughness. At the other end a square socket 377 is welded to the handle 373. The tool has a bail 379 whose rod 381 engages the socket 377.

To remove the screw fasteners 55, the head 375 is engaged with a hexagonal opening 383 (FIG. 3) centered in the head of the screw fastener and torque is applied by a wrench in engagement with the socket 377. The torque applied overrides the crimp and the fasteners 55 are unscrewed and lodged in the sleeves 357. When all the screw fasteners in the nozzle 41 have been lodged in the sleeves, the fixture 351 is disengaged from the nozzle. With the aid of tool 369, the fixture is removed to a preselected position or receptacle (not shown) and the screw fasteners are removed from the bushings 357. The bottom nozzle may then be removed with a long-handled tool.

For installing or reinstalling a bottom nozzle 41, crimping fixture 391 in addition to fixture 351 is required. Crimping fixture 391 includes a plate 393 having a plurality of crimping units. Each unit includes a shaft 395 to whose lower end a crimping blade 397 is secured. The shaft 395 has a head or flange 399 which is secured internally to a hex-headed bolt 401. The bolt engages a thread in the plate 393 and when tightened down advances the crimping blade 379 to crimp the skirt 57 (FIG. 3) on screw fastener 55. The plate 393 has a central threaded bronze bushing 403 which is engageable by long-handled tool 369 (see FIG. 23) to manipulate the fixture 391. The plate 393 also has wedge-pin, split-sleeve assemblies 405 for securing it to and aligning it with a nozzle. When the fixture 391 is positioned over a nozzle 41 and aligned with and secured to the nozzle, the crimping blades 397 are centered over the thimbles 37 (FIG. 1).

Where a nozzle is being replaced by a new nozzle, fixture 351 is secured to and aligned with the new nozzle at the work position. Screw fasteners 55 are then inserted in the bushings 357. With aid of tool 359, the fixture 351 and the new nozzle are moved to the fuel assembly 31 in the container 113 and the nozzle is positioned and aligned on the fuel assembly with the thimbles 37 penetrating into the nozzle plate 51 (FIG. 3). With tool 371 the screw fasteners are then injected through plate 51 into the threaded ends of the thimbles and screwed into the sleeves in the thimbles. The fixture 351 is then disconnected from the nozzle and crimping fixture 391 is secured to and aligned with the nozzle. The bolts 401 are then turned crimping the skirts 57 of the screw fasteners into the grooves 59 in the plate 51. The crimping fixture is then removed.

Where a removed nozzle is to be reused, the nozzle is moved to a suitable working position underwater. The screw fasteners 55 are inserted in the sleeve 357 of the fixture 351 at the work position. With the aid of tool 369 and long-handled wrenches the fixture is secured to and aligned with the nozzle. The nozzle is then positioned on the assembly in container 113 and the screw fasteners 55 are injected in and screwed into the sleeves in thimbles. The fixture 351 is then replaced by crimping fixture 391 and the screw fasteners are crimped in the grooves 59.

While preferred embodiments of this invention are disclosed herein, many modifications thereof are feasible. This invention is not to be restricted except insofar as is necessitated by the spirit of the prior art.

We claim:

1. The method of processing a nuclear fuel assembly so that is is accessible for removal or replacement of fuel rods, said fuel assembly having a top nozzle and a bottom nozzle and being positioned in the refueling pit of a nuclear-power plant with its top nozzle upwardly and its bottom nozzle downwardly, said fuel assembly being more readily accessible for removal and/or replacement of fuel rods through said bottom nozzle, the said method being practiced with a container, the said method comprising, securing said fuel element in said container with its top nozzle upwardly and its bottom nozzle downwardly, rotating said container with said assembly therein to position said assembly with its bottom nozzle upwardly and its top nozzle downwardly; removing said bottom nozzle, and removing or replacing said fuel rods as required.

2. Apparatus for disposing a nuclear fuel assembly, which is located in a refueling pit of a nuclear power plant so that it is accessible for removal or replacement of fuel rods, said fuel assembly having a top nozzle and a bottom nozzle and being positioned for such disposing with its top nozzle upwardly and its bottom nozzle downwardly, said assembly being more readily accessible as aforesaid through its bottom nozzle than through its top nozzle, the said apparatus including a support to be positioned on a surface under a depth of water in said refueling pit, a container for receiving a nuclear fuel assembly with its top nozzle upwardly and its bottom nozzle downwardly, means connected to said container for securing an assembly so received in said container, means, connected to said support and to said container, for mounting said container rotatable on said support, and, means connected to said mounting means, for rotating said container from said position in which the top nozzle of a fuel assembly in said container faces upwardly and the bottom nozzle of a fuel assembly faces downwardly to a position in which said bottom nozzle faces upwardly and said top nozzle faces downwardly.

3. The apparatus of claim 2 wherein the container-mounting means includes columns extending generally vertically from the support, shaft means secured to, and extending laterally from, the container and bearings in said columns rotatably engaging said shaft means, and the container-rotating means includes gear means on said shaft means and means, to be remotely actuated, to be connected in driving relationship with said gear means.

4. The apparatus of claim 2 wherein the container has top and bottom caps, at least one of said caps having guide pins to engage receptacles in a fuel assembly within the container to maintain the alignment of said assembly.

5. The apparatus of claim 2 wherein the container has top and bottom removable caps, at least one of said caps including pads for engaging the nozzle of a fuel assembly within the container which nozzle is directly under said one cap, to exert axial pressure on said fuel assembly to suppress axial movement of said fuel assembly in the container.

6. The apparatus of claim 2 wherein the container has top and bottom removable caps, the top cap having pads for engaging the upper nozzle of a fuel assembly within the container to exert axial pressure, on the fuel assembly to suppress axial movement of said fuel assembly in the container.

7. The apparatus of claim 2 wherein the container has top and bottom removable caps and means, cooperative with said caps, to exert axial pressure on a fuel assembly within the container to suppress axial movement of said assembly, said apparatus also including additional means, connected to said container, for exerting lateral pressure on said fuel assembly to prevent movement of said assembly when one of said caps is removed and also to maintain skeleton squareness of said assembly when a nozzle of said assembly is removed.

8. The apparatus of claim 2 wherein the container-rotating-means includes a first shaft secured to said container and having thereon a gear, a shaft having thereon a pinion cooperative with said gear, a long drive shaft to be removably engaged in driving relationship with said short shaft, and remotely actuable means for rotating said long shaft to drive said first shaft through said shunt shaft, pinion and gear to rotate said container.

9. The apparatus of claim 8 wherein the first shaft is generally horizontal and the short and long shafts are generally vertical.

10. The apparatus of claim 9 wherein the remotely actuable means is manually actuable and the drive shaft is rotatable by said remotely actuable means through a worm-gear reducer to mantain the container with a fuel assembly therein continually under control during rotation and to enable the container to stop at any angular position when an operator ceases to apply force to rotate the container.

11. For use in the removal of fuel rods from a nuclear fuel assembly, said assembly having a nozzle including a plate, preventing access to said fuel rods, from which plate a plurality of control-rod thimbles extend, each of said thimbles being secured to said plate by a screw-fastener having a lock-pin in its head, said lock-pin being welded to said plate; apparatus for conditioning said nozzle to be removed from said assembly by disengaging said screw fasteners from said plate, the said apparatus including a cutter to engage and sever each said weld, a shaft connected to said cutter, drive means for said cutter, coupling between said drive means and said shaft for rotating said cutter in cutting relationship with said weld while permitting said shaft and cutter to float generally along the axis of rotation of said cutter, and means, connected to said shaft, for advancing said cutter through said weld generally along said axis of rotation as said cutter rotates in contact with said weld to sever said weld.

12. The apparatus of claim 11 including two pairs of arms which extend laterally with respect to the axis of the floating shaft in the form of a crucifix, one pair including guide pins to position said apparatus for severing a weld and the other pair including means for securing said apparatus in any position.

13. The apparatus of claim 11 wherein the cutter-advancing means includes a feed plate connected to the floating shaft, and a feed shaft, connected to the feed plate, for advancing the feed plate and the shaft axially of the shaft and means for actuating said feed shaft to advance said plate and shaft.

14. The apparatus of claim 13 wherein the feed plate extends from the floating shaft laterally of said floating shaft and wherein the feed shaft is displaced laterally of said floating shaft and engages the feed plate in a region displaced laterally from said floating shaft.

15. The apparatus of claim 11 wherein the cutter is remotely driven through the floating shaft and the advancing means includes a feed plate connected to the floating shaft, and a feed shaft, connected to the feed plate, for advancing the feed plate and the shaft axially of the shaft, and remotely-operable means for actuating said feed shaft to advance said plate and shaft.

16. The apparatus of claim 15 wherein the feed shaft is manually actuable by a thumb screw.

17. The apparatus of claim 11 including a fixture cooperative with the conditioning apparatus to index the conditioning apparatus to position said cutter successively to sever each of the welds securing the thimbles to the plate.

18. The apparatus of claim 17 wherein the fixture includes a plurality of bushings each disposed to extend over a screw fastener, the cutter passing through and being guided by a bushing including means when it is advanced into engagement with a weld, each said bushing sealing the region around said associated screw fastener to contain the chips generated by the severing of the weld of said associated screw fastener.

19. The apparatus of claim 18 wherein the bushings are suspended from a plate secured to the nozzle.

20. The apparatus of claim 19 wherein the plate secured to the nozzle is encompassed by plate means, said plate means having holes for positioning and securing the conditioning means with the cutting tool successively in cutting engagement with the welds of different screw fasteners.

21. For use in the removal of fuel rods from a fuel assembly, said assembly having a nozzle including a plate preventing access to said fuel rods, a plurality of thimbles extending from said plate, each of said thimbles being secured to said plate by a screw-fastener having a lock-pin in its head, said lock-pin being welded to said plate, the said nozzle being conditioned for removal from said assembly by a cutter which severs the welds connecting each of said screw-fasteners to said plate from said plate; a fixture cooperative with said cutter to effectuate the severing of each said welds, said fixture including a plurality of bushings, and means mounting each said bushing to be positioned generally coaxially with each said screw fasteners thereby to guide said cutter to the weld of each said screw fastener, each said bushing including means for encircling each said screw fastener to seal the region around said screw fastener so as to retain in said region the chips from the severing of each said weld.

22. The apparatus of claim 18 wherein the sealing means includes a sleeve near that end of each bushing nearest the associated screw fastener to seal the region around the screw fastener to contain in said region the chips from the severing of the associated weld.

23. The fixture of claim 21 wherein the encircling means includes a sleeve near that end of each bushing nearest the associated screw fastener to seal the region around said screw fastener to contain in said region the chips from the severing of the associated weld.

24. The fixture of claim 21 wherein the means for mounting the bushing includes a bushing plate to be secured to the nozzle, the bushings being mounted in said bushing plate so that when said bushing plate is secured to said nozzle said bushings extend generally coaxially with said screw fasteners and the encircling means seals the region around said screw fasteners.

25. The fixture of claim 24 including means suspended from the bushing plate for indexing the cutter to sever successively the welds of the lock-pin of each of said plurality of thimbles.

26. For use with the apparatus of claim 18 a tool having a long shaft and having at the end of said shaft a tool head having a slot to engage the lock-pin of a screw-fastener, said shaft being dimensioned to extend into a bushing so that the slot engages the lock-pin, said tool also having means to operate said tool while said lock-pin is so engaged to unscrew the screw fastener from the associated thimble.

27. The tool of claim 26 for use in the conditioning of the nozzle to be removed from the fuel assembly, each screw-fastener securing the plate of the nozzle to the associated thimbles having an axial hole which is counterbased about the lock-pin, the head of the tool being dimensioned so as to enter the counterbase enabling the slot in the head to engage the lock-pin in the counterbore.

28. For use in the removal of chips generated by the severing of the lock-pin welds joining the plate of a nozzle of a fuel assembly to the thimbles, said chips being trapped in the region of the plate sealed by a bushing of a bushing plate of a fixture through which the cutter for severing the welds penetrated, said plate being underwater at a substantial depth; an eductor including a water suction pump having an outlet, a separator having an inlet, a suction tube, a venturi, said separator, suction tube and venturi being underwater at said substantial depth, a long water conductor connecting the outlet of said pump to said venturi, means, connecting said venturi to the inlet of said separator, so that water flowing out of the discharge side of said pump flows through said venturi to said separator, said flowing water producing suction across said venturi, a conductor connecting the suction tube across said venturi so that the force of the suction across said venturi acts through said suction tube, and a long-handle guide, operable from a position above the surface of the water, for injecting said suction tube into each of said bushings so that the chips are sucked through said suction tube and venturi into said separator.

29. The fixture of claim 24 including an additional bushing in the bushing plate, said additional bushing terminating in an opening at its end which is to face the nozzle plate at a level above the other bushings so that when the fixture is engaged with the nozzle said additional bushing terminates in said opening above the nozzle plate, and a conductor connected to said opening in said additional bushing, said conductor to be connected to an eductor for removing chips adhering to a weld cutter inserted in that opening of said additional bushing which is remote from the nozzle plate.

30. The method of removing chips adhering to a cutter which severs the lock-pin welds securing screw fasteners engaging the thimbles extending from the nozzle plate of a nuclear fuel assembly, the said method being practiced with apparatus including a bushing plate to be mounted above the nozzle plate, said bushing plate having a bushing terminating in openings at each end thereof, said apparatus also including an eductor for impressing a suction force; the said method comprising inserting said cutter into that opening in said bushing which is remotest from the nozzle plate when said bushing plate is mounted in said nozzle, connecting said eductor to the opening of said bushing which is nearest said nozzle plate when said bushing plate is mounted on said nozzle, and enabling said eductor to impress a suction force in said bushing to remove said chips by suction.

31. For use in the removal of a reconstitutable nozzle from a nuclear fuel assembly, the said nozzle including a nozzle plate from which control-rod thimbles extend, said thimbles being secured to the nozzle plate by screw fasteners crimped or swaged to said plate; a fixture including a tube plate having a plurality of tubes extending therefrom, said tube plate to be mounted on said nozzle, each of said tubes extending over a screw fastener in said nozzle plate when said tube plate is so mounted and permitting penetration of a tool to exert sufficient torque to disengage and unscrew said screw fasteners, each said tubes having an inner sleeve dimensioned to permit said screw fasteners to be raised through said sleeves but capturing said fasteners once they are so raised.

32. The fixture of claim 31, for use with a nozzle plate having holes on the periphery thereof, the tube plate of said fixture including locking means engageable with said holes for securing said tube plate to said nozzle.

33. The fixture of claim 31 wherein the tube plate has a tapped bushing to be engaged by the threaded end of a long-handled tool enabling manipulation of the fixture.

34. For use in completing the reinstalling of the nozzle of a reconstitutable nozzle of a nuclear fuel assembly, the said nozzle including a nozzle plate connected to control-rod thimbles of said assembly by screw fasteners; a fixture including a crimping plate, said plate to be mounted on said nozzle, crimping blades extending from said crimping plate, said blades being so positioned that when said crimping plate is mounted on said nozzle each of said blades is in crimping position with reference to a screw fastener, and means for actuating said crimping blades to crimp the associated fastener to the nozzle plate.

35. The fixture of claim 34, for use with a nozzle plate having holes on the periphery thereof, the crimping plate of the fixture having locking means engageable with said holes for securing said crimping plate to said nozzle.

36. The fixture of claim 34 wherein the crimping plate has a tapped bushing to be engaged by the threaded tip of a long-handled tool for manipulating said fixture.

37. The method of removing from a nuclear fuel assembly a nozzle, said nozzle including a nozzle plate, said assembly having control rod thimbles secured to said plate by screw-fasteners having lock-pins welded to the nozzle plate, said method being practiced with apparatus including a bushing plate to be mounted on said nozzle, said bushing plate having a plurality of bushings positioned so that when said bushing plate is mounted on said nozzle each of said bushings encircles a screw fastener and seals the region around said screw fastener, the said apparatus also including an eductor including a suction tube for impressing a suction force; the said method including mounting said bushing plate on said nozzle with each of said bushings encircling a screw-fastener and sealing the region around said each screw fastener, severing the weld of each said screw fastener whereby the chips resulting from said severing of each weld are captured in the region sealed by the associated bushing, injecting said suction tube into each bushing and enabling said eductor to suck said chips out of the associated sealed region of the bushing in which said suction tube is injected; collecting said chips in a region from which the radioactive radiation from said chips is suppressed, after said chips have been removed unscrewing the screw fastener from each said control-rod thimble, thereafter injecting the suction tube in each said bushing and enabling said eductor to capture each said screw fastener in said suction tube, removing said suction tube from each bushing with each screw fastener in its turn attached thereto, with said eductor enabled, removing said screw fasteners to a region from which the radioactive radiation of screw fasteners are suppressed, disabling said eductor to deposit each screw fastener in said last-named region and after all said screw fasteners have been collected removing said nozzle from said bushing plate.

38. The apparatus of claim 2 wherein the fuel assembly is radioactively "hot" and is processed as described in claim 1 underwater at a substantial depth and wherein the container has a top end cap and a bottom end cap, said bottom end cap having holes so that when the fuel assembly is thrust into the container, the assembly ejects water in said container through said holes.

39. The method of rendering a nuclear fuel assembly which is radioactively "hot" accessible for removal and/or replacement of fuel rods or equivalent by removal and replacement of a nozzle thereof, the said assembly being of the type in which said nozzle is secured by screw fasteners welded to the nozzle plate, the said method comprising
 (a) positioning said fuel assembly so that said nozzle is accessible for processing,
 (b) severing the welds of the screw fasteners,
 (c) removing the screw fasteners,
 (d) removing said nozzle,
 (e) removing fuel rods to be removed, if any, or equivalents, from said assembly,
 (f) inserting fuel rods to be inserted, if any, or equivalents, in said assembly,
 (g) mounting on said assembly a replacement nozzle, said replacement nozzle being of the type to be secured to said assembly by screw fasteners which are secured by crimping or swaging, and
 (h) securing said replacement nozzle on said assembly by engaging and crimping the screw fasteners, the above defined steps (a) through (h) being carried out with the assembly under a substantial depth of water.

* * * * *

Disclaimer 4,522,780.—*John M. Shallenberger*, O'Hara Township, Allegheny County and *Stephen J. Ferlan*, Pittsburgh, Pa. REMOVAL AND REPLACEMENT OF FUEL RODS IN NUCLEAR FUEL ASSEMBLY. Patent dated June 11, 1985. Disclaimer filed Jan. 27, 1986, by the assignee, *Westinghouse Electric Corp.*

Hereby enters this disclaimer to claims 1 and 2 of said patent.
[*Official Gazette April 1, 1986.*]